United States Patent
Ishimaru et al.

(10) Patent No.: US 12,157,291 B2
(45) Date of Patent: Dec. 3, 2024

(54) LASER-PRINTED DISPLAY BODY AND PACKAGING

(71) Applicant: TOYOBO CO., LTD., Osaka (JP)

(72) Inventors: Shintaro Ishimaru, Fukui (JP); Masayuki Haruta, Fukui (JP)

(73) Assignee: TOYOBO CO., LTD., Osaka (JP)

( * ) Notice: Subject to any disclaimer, the term of this patent is extended or adjusted under 35 U.S.C. 154(b) by 0 days.

(21) Appl. No.: 18/030,110

(22) PCT Filed: Oct. 6, 2021

(86) PCT No.: PCT/JP2021/036989
§ 371 (c)(1),
(2) Date: Apr. 4, 2023

(87) PCT Pub. No.: WO2022/080211
PCT Pub. Date: Apr. 21, 2022

(65) Prior Publication Data
US 2024/0001658 A1    Jan. 4, 2024

(30) Foreign Application Priority Data

Oct. 12, 2020    (JP) ................................ 2020-172084

(51) Int. Cl.
*B32B 27/08* (2006.01)
*B32B 27/20* (2006.01)
(Continued)

(52) U.S. Cl.
CPC .............. *B32B 27/20* (2013.01); *B32B 27/08* (2013.01); *B32B 27/32* (2013.01); *B32B 27/36* (2013.01);
(Continued)

(58) Field of Classification Search
None
See application file for complete search history.

(56) References Cited

U.S. PATENT DOCUMENTS 7,541,088 B2 * 6/2009 Bennett .................... B32B 27/20
                                                        428/323
8,597,774 B2 * 12/2013 Fukue ....................... B41M 5/52
                                                        428/206
(Continued)

FOREIGN PATENT DOCUMENTS

JP    2002-362027    12/2002
JP    2005-144784    6/2005
(Continued)

OTHER PUBLICATIONS

JP 2016-124562A Machine Translation via EPO (Year: 2016).*
(Continued)

*Primary Examiner* — Laura C Powers
(74) *Attorney, Agent, or Firm* — WENDEROTH, LIND & PONACK, L.L.P.

(57) ABSTRACT

A display body characterized in that there is at least one white printing layer permitting printing by means of laser irradiation; said white printing layer has a nonprinted region and a printed region at which laser printing has been carried out; and (1) through (3) are satisfied. (1) An absolute value of a difference in color L* values between the printed region and the nonprinted region is not less than 1.0 but not greater than 10.0. (2) Total luminous transmittance of the nonprinted region is not less than 8% but not greater than 50%. (3) Fractional decrease in thickness of the printed region in a cross-sectional direction is not less than 1 vol % but not greater than 80 vol % of that of the nonprinted region. A high-quality display body, with high productivity is provided.

14 Claims, 2 Drawing Sheets

(51) Int. Cl.
  *B32B 27/32* (2006.01)
  *B32B 27/36* (2006.01)
  *B65D 65/40* (2006.01)
(52) U.S. Cl.
  CPC .......... *B65D 65/40* (2013.01); *B32B 2250/03* (2013.01); *B32B 2250/24* (2013.01); *B32B 2250/40* (2013.01); *B32B 2264/1022* (2020.08); *B32B 2264/104* (2013.01); *B32B 2270/00* (2013.01); *B32B 2307/4026* (2013.01); *B32B 2307/414* (2013.01); *B32B 2307/518* (2013.01); *B32B 2307/54* (2013.01); *B32B 2307/542* (2013.01); *B32B 2307/554* (2013.01); *B32B 2307/7376* (2023.05); *B32B 2307/75* (2013.01); *B32B 2435/02* (2013.01); *B32B 2519/00* (2013.01)

(56) References Cited

U.S. PATENT DOCUMENTS

| | | |
|---|---|---|
| 2008/0076065 A1 | 3/2008 | Bennett et al. |
| 2016/0168399 A1 | 6/2016 | Matoda et al. |

FOREIGN PATENT DOCUMENTS

| | | | |
|---|---|---|---|
| JP | 2008-80805 | | 4/2008 |
| JP | 2015127110 A | * | 7/2015 |
| JP | 2016-124562 | | 7/2016 |
| JP | 2017-209847 | | 11/2017 |
| JP | 2018039269 A | * | 3/2018 |
| JP | 2018-153973 | | 10/2018 |
| JP | 2020-2259 | | 1/2020 |
| WO | 2014/188828 | | 11/2014 |

OTHER PUBLICATIONS

JP2018-153973A Machine Translation via EPO (Year: 2018).*
JP 2018-039269 Machine Translation via WIPO (Year: 2018).*
JP2015-127110 Machine Translation via WIPO (Year: 2015).*
English translation of International Preliminary Report on Patentability issued Apr. 13, 2023 in corresponding International (PCT) Application No. PCT/JP2021/036989.
International Search Report issued Dec. 14, 2021 in International (PCT) Application No. PCT/JP2021/036989.
Tzou, "Ultrafast Laser Heating on Metal Films: Effects of Microvoids", Journal of Thermophysics and Heat Transfer, 2002, vol. 16, No. 1, pp. 30-35.
Richter et al., "Simulation study of the impact of interface roughness and void inclusions on $Cu(In,Ga)(Se,S)_2$ solar cells", Phys. Status Solidi (A), Applications and Materials, 2015, vol. 212, No. 2, pp. 298-306.

* cited by examiner

LASER-PRINTED DISPLAY BODY AND PACKAGING

TECHNICAL FIELD

The present invention relates to a display body comprising printing or other such display. In particular, the present invention relates to a display body at which laser printing has been carried out on white film.

BACKGROUND ART

Packaging has conventionally been employed in supply chain goods as typified by foods, pharmaceutical agents, and industrial products. For the most part, such packaging not only protects the contents but also has the role of displaying (hereinafter sometimes referred to as "printing") information pertaining to the product name, manufacturing date, raw materials, and so forth. As means for achieving such display, labels (tack labels) at which adhesive is applied on the back surface of a substrate permitting printing by means of thermal transfer or ink as described for example at Patent Reference No. 1 are in wide use. A tack label is such that information is printed in advance on the front surface constituting the display surface thereof, and while in this state is affixed to a release sheet (liner), this being removed from the liner and affixed to packaging during use. After the tack label has been affixed thereto, because the liner no longer serves a purpose, the more labels that are used the greater will be the increase in trash that is produced. Furthermore, as the label user must have labels of differing displayed content in correspondence to the types of contents to which they pertain, management of labels grows increasingly complex as the types of contents increase, and this has brought with it the increased likelihood that a mistake might be made with respect to which label is affixed to what. Moreover, it has normally been necessary to have on hand an excess supply thereof so as to be ready in the event of a shortage, which has meant that when manufacture or sale of the contents to which they pertain is terminated, there being no further use for such labels, it has been the case that they are discarded. Tack labels have thus been besought with various problems.

To eliminate such problems, Patent Reference No. 2, for example, discloses a heat-sensitive film having a heat-sensitive recording layer. Because the film of Patent Reference No. 2 changes color when affected by heat, it itself has display capability, making use of tack labels unnecessary. Furthermore, where a film such as that at Patent Reference No. 2 is employed, because, during an operation in which a pouch is formed from packaging, it will be possible, by incorporating a thermal printer or other such printing device therein, to cause pouch forming and display to be completed in a single operation, this has also contributed to reduction in labor and reduction in cost. Because of the advantages possessed thereby, techniques in which printing is carried out directly on the film which itself constitutes the packaging have recently become popular. However, because when a heat-sensitive layer is provided on a substrate film there is a possibility that rubbing or the like with the exterior will cause delamination of the heat-sensitive layer, it has normally been the case that a protective layer has been provided (at the surfacemost layer) over the heat-sensitive layer. As means for providing functional layers including such protective layers, coating is widely and commonly employed. However, as coating necessitates passage through at least application, drying, and winding operations, and because the greater the number of functional layers there are the more operations there will be, this causes reduction in productivity. Moreover, many such functional layers have particles, and where this is the case there has also been the problem that transparency has been reduced to the extent that there has been increase in thicknesses of layers. Moreover, the foregoing tack labels and other such techniques of printing by means of ink, and thermal labels and other such techniques of printing by means of heat, have each been such that, when attempts were made to reduce printed size, spreading has prevented the resolution (approximately 0.2 mm) which is visually perceivable by human beings from being reached. Because there is much information that is required on packaging for drugs and the like, notwithstanding that there has been demand for reduction in printed size, there has been a limit to that which has been achievable with the foregoing conventional art.

On the other hand, it is recently the case that not only display techniques in which the heat and ink cited above but also those in which lasers serve as trigger have become popular. For example, Patent Reference No. 3 discloses an additive for laser marking that consists of bismuth oxide. Kneading this additive into a plastic makes it possible to cause change in color at regions irradiated by a laser, permitting printing to be carried out. Whereas plastics alone do not normally undergo reaction due to lasers, excitation of this additive by the energy from a laser can be made to cause scorching of the plastic, and to furthermore cause it to itself undergo a change in color, as a result of which printing is made possible. Because the additive is disposed at the interior of the film, this technique makes it possible to solve the problem of delamination of functional layers that had been occurring with coatings. Moreover, because spreading of printing tends not to occur when a laser is employed, this will also make it possible for the size of lettering to be made to be that which is resolvable by human beings or smaller. However, because the metal particulate disclosed at Patent Reference No. 3 is such that concealment is not manifested despite addition thereof to film, it fails to reach a level such as would allow it to serve as substitute for a white display body such as a tack label. When the concealment of the substrate is inferior, not only will contents tend to degrade due to light, but there has also been the problem that printing tends to be not easily seen. Regarding the latter, with packaging fabricated through use of a display body at which printing has been carried out on transparent film, it has been pointed out that there is a deficiency in that it becomes difficult to determine what has been printed when printing overlaps the contents and/or the background peripheral thereto. This deficiency has likewise been pointed out with respect to the foregoing heat-sensitive film. Where large amounts of the metal particulate described at Patent Reference No. 3 have been added in an attempt to improve concealment, while this has caused the film which constitutes the substrate to become black in color, the fact that printing by means of laser also produces a color that is close to black has made it difficult for this to be distinguished from the substrate, and so in this case as well there was no improvement in ability to visually perceive printing.

As a technique capable of solving this problem, Patent Reference No. 4, for example, discloses an ink composition for laser marking containing titanium oxide and a laminated body employing same. Because the primary constituent of this composition is titanium oxide and it is white in color, the concealment possessed by a laminated body that employs this is satisfactory, and ability to visually perceive laser printing is also satisfactory. However, when a composition such as that at Patent Reference No. 4 is laminated as a laser marking layer (hereinafter sometimes referred to as "printing layer") with the surfacemost layer of a film serving as substrate, here again the problem of delamination of printing due to rubbing or other such external stimulation remains. Furthermore, where, in an attempt to avoid such delamination, the laser marking layer is made to be an intermediate layer, because the substrate film must be provided at a surfacemost layer, this causes increase in the number of lamination operations and reduction in productivity.

Patent Reference Nos. 5 and 6 disclose a polyester film or laminated body made to permit printing as a result of a laser marking agent having been kneaded directly into the film. There is reason to hope that such art will be able to solve the various problems of concealment, ability to visually perceive printing, layer delamination, and productivity that have been mentioned hereinabove. However, the current state of affairs is that the art at Patent Reference Nos. 5 and 6 is art that was disclosed at least 10 or more years ago, and yet it has not satisfied the printing performance (print density) needs of the present. It is normally the case that the greater the amount of laser marking agent that is added thereto the greater will be the improvement in print density. While the optimum amount of laser marking agent (hereinafter sometimes referred to as "laser pigment") to be added thereto will depend on the type thereof, most of the Working Examples at Patent Reference Nos. 5 and 6 employ approximately 1 wt % to 5 wt % thereof, that which employs the most thereof employing 18 wt % thereof. Where the amount of laser marking agent added thereto has been increased therebeyond in an attempt to improve print density, this has caused the film to become brittle, to have reduced heat resistance, to acquire a color other than white, and/or for other such problems to occur.

PRIOR ART REFERENCES

Patent References

Patent Reference No. 1: Japanese Patent Application Publication Kokai No. 2002-362027

Patent Reference No. 2: Japanese Patent Application Publication Kokai No. 2017-209847

Patent Reference No. 3: International Patent Application Publication No. 2014/188828

Patent Reference No. 4: Japanese Patent Application Publication Kokai No. 2020-2259

Patent Reference No. 5: Japanese Patent Application Publication Kokai No. 2005-144784

Patent Reference No. 6: Japanese Patent Application Publication Kokai No. 2008-80805

NONPATENT REFERENCES

Nonpatent Reference No. 1: D. Y. Tzou, Ultrafast Laser Heating on Metal Films: Effects of Microvoids, J. Thermophys. Heat. Trans., 2002, vol. 16, No. 1, p. 30-35.

Nonpatent Reference No. 2: Michael Richter, Ingo Riedel, Christian Schubert, Patrick Eraerds, Jurgen Parisi, Thomas Dalibor, Jorg Palm, Simulation study of the impact of interface roughness and void inclusions on Cu(In,Ga)(Se,S)2 solar cells, Physica Status Solidi (A) Applications and Materials, 2015, vol. 212, No. 2, p. 298-306.

SUMMARY OF THE INVENTION

Problem to be Solved by Invention

It is an object of the present invention to solve problems of the conventional art such as the foregoing. To wit, it is an object of the present invention to provide, with high productivity, a high-quality display body, which, among display bodies at which laser printing is carried out, while having particularly high concealment, does not experience delamination of printing even where there is occurrence of rubbing or other such external stimulation, and which, due to its high definition and print density, is such as to permit lettering to be distinctly visually perceivable.

Means for Solving Problem

The present invention is constituted as follows.
1. A display body characterized in that there is at least one white printing layer permitting printing by means of laser irradiation;
  said white printing layer has a nonprinted region and a printed region at which laser printing has been carried out; and
  (1) through (3), below, are satisfied; wherein:
  (1) an absolute value of a difference in color L* values between the printed region and the nonprinted region is not less than 1.0 but not greater than 10.0;
  (2) total luminous transmittance of the nonprinted region is not less than 8% but not greater than 50%; and
  (3) fractional decrease in thickness of the printed region in a cross-sectional direction is not less than 1 vol % but not greater than 80 vol % of that of the nonprinted region.
2. The display body according to 1. characterized in that laser printing pigment in the form of at least one species—whether alone or as a compound—selected from among the group consisting of bismuth, gadolinium, neodymium, titanium, antimony, tin, aluminum, calcium, and barium is present within the white printing layer.
3. The display body according to 2. characterized in that the laser printing pigment present within the white printing layer is at least one of titanium oxide or calcium carbonate
4. The display body according to any of 1. to 3. characterized in that the laser printing pigment present within the white printing layer is not less than 5 mass % but not greater than 50 mass %.
5. The display body according to any of 1. to 4. characterized in that void content at the nonprinted region is not less than 10 vol % but not greater than 80 vol %.
6. The display body according to any of 1. to 5. characterized in that thickness of the nonprinted region at the white printing layer permitting printing by means of laser irradiation is not less than 5 μm but not greater than 200 μm.
7. The display body according to any of 1. to 6. characterized in that either height or width of printed size in the printed region is not less than 0.2 mm but not greater than 100 mm.
8. The display body according to any of 1. to 7. characterized in that resin making up the white printing layer is primarily any of polyester, polypropylene, and/or polyethylene.
9. Packaging that comprises a lid member and/or label, and that is characterized by employment at least at a portion thereof of the display body according to any of 1. to 8.

Benefit of Invention

The present invention is able to provide, with high productivity, a display body that permits distinct printing, that does not experience delamination of printing due to rubbing or other such external stimulation, that has high concealment, and that reduces mistaken display and/or waste material which have been problems where conventional tack labels were employed.

EMBODIMENTS FOR CARRYING OUT THE INVENTION

Figure 1:
FIG. 1 Printed region at display body in accordance with Working Example 1.

Below, description is given with respect to a display body in accordance with the present invention.

1. Display Body Properties

At a display body in accordance with the present invention, there is at least one white printing layer permitting printing by means of laser irradiation, and said white printing layer has a nonprinted region and a printed region at which laser printing has been carried out, the properties indicated below being essential and/or preferred requirements. Note that the "printed region" and "nonprinted region" referred to below indicate positional relationships in directions within the plane of the display body, the former indicating portions that have been irradiated by laser and that have been made to become black in color, and the latter indicating portions that have not been irradiated by laser and that remain white in color. Furthermore, the terms "printing layer" and "other layer(s)" are unrelated to whether or not there is printing thereat, but refer to how respective layers are arranged in the cross-sectional (thickness) direction of the display body. Detailed description is given below with respect to "printing layer" and "other layer(s)." Moreover, the "display body" is sometimes referred to below as "film."

1-1. Color L* Value (Nonprinted Region-Printed Region)

At a display body in accordance with the present invention, it is required that the absolute value of the difference in color L* values between the printed region and the nonprinted region (hereinafter sometimes referred to simply as "difference in L* values") be not less than 1.0 but not greater than 10.0. When this difference is less than 1.0, the colors of the printed region and nonprinted region will be close, and it will be difficult to visually perceive printing even where total luminous transmittance, described below, is not less than 8% but not greater than 50%. On the other hand, when the difference in L* values exceeds 10.0, this is not preferred, because, although printing will tend to be visually perceived, it will be necessary to increase the power with which laser irradiation is carried out by a corresponding amount, and there will be a tendency for the fractional decrease in the thickness of the printed region, described below, to exceed 80 vol %. It is more preferred that the difference in L* values be not less than 1.5 but not greater than 9.5, and still more preferred that this be not less than 2.0 but not greater than 9.0.

1-2. Total Luminous Transmittance (Nonprinted Region)

At a display body in accordance with the present invention, it is required that the total luminous transmittance of nonprinted region(s) be not less than 8% but not greater than 50%. While the lower the total luminous transmittance of nonprinted region(s) the more improvement there will be in the concealment of the display body, which would be preferred, where an attempt is made to achieve under 8% there will be a tendency for void content to exceed 80 vol % and for laser printing pigment to exceed 50 mass %, and there will be a possibility that the mechanical strength of the display body would be reduced. On the other hand, when total luminous transmittance exceeds 50%, this is not preferred, because not only will the concealment of the display body be reduced, but the film will be close to being transparent even where the color L* value is not less than 1 but not greater than 10, making recognition of printing difficult. It is more preferred that total luminous transmittance of nonprinted region(s) be not less than 10% but not greater than 48%, and still more preferred that this be not less than 12% but not greater than 46%.

1-3. Fractional Decrease in Thickness (Printed Region)

At a display body in accordance with the present invention, it is an essential requirement that the fractional decrease in the thickness of the printed region in the cross-sectional direction be not less than 1 vol % but not greater than 80 vol % of that of the nonprinted region. The fractional decrease in thickness is the value calculated according to Formula 3 (see "Film Thickness (Printed Region and Nonprinted Region)" below). The measurement method is described in detail below. When the display body is irradiated by a laser, laser marking agent contained within the display body undergoes excitation due to the energy of the laser, and printing takes place as a result of carburization of the plastic that makes up the film. At this time, melting/gasification and so forth occur simultaneous with carburization of the plastic, reducing the volume thereof (etching effect). While room for argument remains with respect to the parameters that affect the visual perceivability of the printing which is formed by the laser, in addition to the change in color of the plastic and the laser marking agent, it is thought that this etching effect also contributes thereto. That is, this would be a mechanism whereby physical convexities and concavities (especially concavities) are formed in the surface (or, where another layer is laminated at the surface layer, the interface with such laminated body) of the printed region as a result of laser irradiation, causing the degree to which scattering of light occurs (how it appears) at such portions to be altered relative to the nonprinted region, improving visual perceivability of printing. Because the greater that the fractional decrease in thickness is made to be the larger will be the convexities and concavities that are formed, it is fair to say that this will cause visual perceivability of printing to be better. When the fractional decrease in thickness is less than 1 vol %, because almost no convexities and concavities will be produced by etching, visual perceivability of printing will be reduced. On the other hand, when the fractional decrease in thickness exceeds 80 vol %, there will be extreme reduction in the thickness of the printed region, increasing the tendency for occurrence of holes, fracture of the display body under tension, and so forth. It is more preferred that the fractional decrease in thickness be not less than 5 vol % but not greater than 75 vol %, and still more preferred that this be not less than 10 vol % but not greater than 70 vol %.

1-4. Void Content

It is preferred that a display body in accordance with the present invention contain void(s), and it is preferred that the content thereof be not less than 10 vol % but not greater than 80 vol % as a fraction of the entirety in the cross-sectional direction (all layers) of the display body. Void content is calculated using a digital microscope to observe the cross-section of the display body. The calculation method is described in detail below.

The effect of voids on display capability in accordance with the present invention is described below.

Conventionally, printing by means of laser was achieved through use of the aforementioned laser printing pigments, and it was the concentration of this pigment that governed print density. However, the present inventor(s) discovered that if pigment concentration is increased to greater than 50 mass % in an attempt to improve print density, this causes there to be a relative decrease in the amount of plastic that makes up the printing layer(s) within the display body, as a result of which the display body becomes brittle (resulting in a tendency for tensile fracture strength in accordance with the present invention to fall below 40 MPa). That is, it was discovered that there was a mutually exclusive relationship between print density and mechanical strength, and that it is difficult to achieve both of these simultaneously. The present inventor(s) have therefore engaged in research with respect to printing layer designs such as might serve as a way to escape this mutually exclusive relationship, and in particular with respect to the effect of voids such as might make it possible to efficiently utilize (absorb) energy from the laser with which these are irradiated. This effect will be described with reference to the Nonpatent References.

Figure 3:
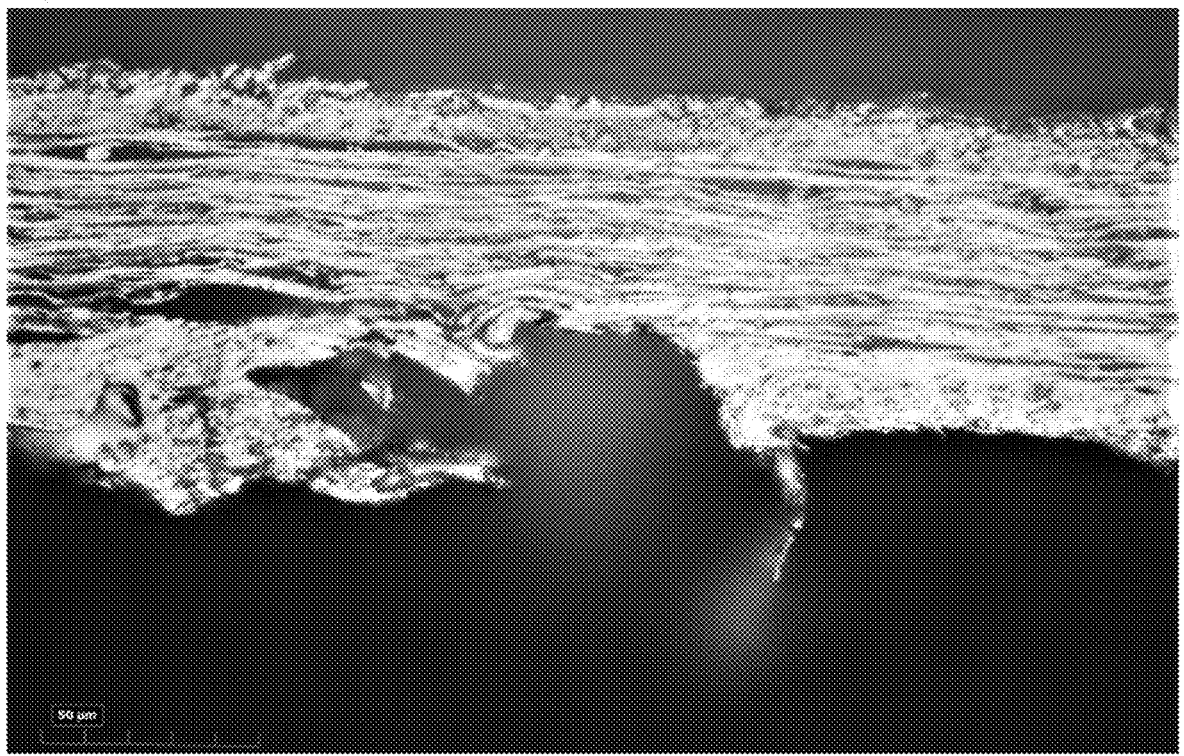
FIG. 3 Image during cross-sectional observation of printed region at display body in accordance with Working Example 1.

Nonpatent Reference No. 1 describes the influence of voids existing within metal thin films in terms of the laser reflectance (change in temperature) when a metal thin film of thickness 0.1 µm is irradiated by a laser. FIG. 3 of Nonpatent Reference No. 1 indicates that when void(s) are present directly below a location irradiated by a laser (to the left of the void(s) at the Nonpatent Reference), laser reflectance decreases by on the order of approximately one order of magnitude as compared with the situation in which no void(s) are present. Since the reflectance of the laser toward the exterior is decreased, this can be interpreted as meaning that this energy is absorbed within the interior of the metal. Although the substrate employed in this Reference was metal, and the metal thickness and void size employed therein were different from those of present invention, the present inventor(s) speculated that it suggested the possibility that existence of void(s) might improve the efficiency with which laser energy is absorbed.

While Nonpatent Reference No. 2 relates to thin-film solar cells, which is a different technical field than that of Nonpatent Reference No. 1. Nonpatent Reference No. 2 studies the efficiency with which electric power is generated when thin-film solar cell surface roughness and internal void size are varied. FIG. 8 of Nonpatent Reference No. 2 shows short-circuit current (Jsc), open-circuit voltage (Voc), and fill factor (FF) when the width of void(s) present at the interface constituting the junction between a light-absorbing layer (CIGSSe) and a back electrode (Mo(Se, s)2) is varied. It is indicated therein that Jsc increases when void width is increased and junction area is made to be 30% or less. It is described that this is a result of the fact that, because the difference in refractive indices between the CIGSSe and the void(s) is greater than the difference in refractive indices between the CIGSSe and the Mo(Se, s)2, light (infrared light) incident thereon is reflected and is again made to be incident on the CIGSSe; i.e., that this effect is a result of improvement in the efficiency with which absorption takes place. While Nonpatent Reference No. 2 differs from the present invention in that the incident light is not a laser but is sunlight, it can be interpreted as saying that there is improvement in absorption efficiency as a result of reflection of an energy light beam by the interface between the bulk and the void(s), causing the present inventor(s) to speculate that an effect due to the same mechanism as at Nonpatent Reference No. 1 might be qualitatively suggested thereby.

Based on the items speculated to exist as a result of the two Nonpatent References cited above, the present inventor(s) engaged in intensive research to design an optimal void such as might be capable of increasing the efficiency with which laser energy is absorbed and improving print density, which culminated in the present invention. That is, the present inventor(s) discovered that by causing void(s) to be present within the printing layer in a ratio that is not less than 10 vol % but 80 vol %, and by causing void height as described below at "2-1-3. Void Height (in Thickness Direction)" to be within a prescribed range, it is possible to cause the number of times that the laser is reflected by the interface between void(s) and plastic within the printing layer, i.e., absorption of the laser by the printing layer, to occur with good efficiency, and to improve print density. When void content is less than 10 vol %, this is not preferred, because the efficiency with which laser light is reflected at the void interface will no longer be adequate, causing reduction in the print density. On the other hand, when void content exceeds 80 vol %, not only is there a possibility that the relative decrease in the amount of plastic that is carburized by laser light will cause there to be a reduction in print density, but there is also a possibility that the tensile fracture strength of the display body will fall below 40 MPa. It is more preferred that void content be not less than 15 vol % but not greater than 75 vol %, and still more preferred that this be not less than 20 vol % but not greater than 70 vol %.

There is no objection to layer(s) that contain void(s) being any layer(s) that make up the display body. For example, void(s) may be present in the same layer(s) as at "2-1. Printing Layer" described below, and a constitution may be adopted in which void(s) are disposed at a central layer, with printing layers being disposed at the two surfaces thereof. In the case of the latter, it is thought that, when reflected by void(s) at the central layer, a laser will again be incident on the printing layer toward the exterior therefrom and will be absorbed. So as to increase the efficiency with which the laser is absorbed, a constitution in which void(s) are contained within printing layer(s) is preferred.

1-5. Void Height (in Thickness Direction)

It is preferred that height(s) (distance(s) in thickness direction of display body) of void(s) contained within printing layer(s) making up the present invention be not less than 1 µm but not greater than 8 µm. Causing void height to be not less than 1 µm but not greater than 8 µm within a domain in which void content is not less than 10 vol % but not greater than 80 vol % will make it possible for there to be an appropriate number of voids in the thickness direction of the printing layer, and will increase the number of times that the laser is reflected and will improve the efficiency with which energy is absorbed. When void height is less than 1 µm, the interface between the void and the resin will no longer be definite, and it will be difficult to achieve a void content of not less than 10 vol %. On the other hand, when void height exceeds 8 µm, this is not preferred, not only because this would cause void content to tend to exceed 80 vol %, but also because this would cause there to be an extreme reduction in the number of voids contained in the thickness direction of the display body, reducing laser reflection/absorption efficiency, and causing worsening of print density. It is more preferred that void height be not less than 1.5 µm but not greater than 7.5 µm, and still more preferred that this be not less than 2 µm but not greater than 7 µm.

1-6. Size of Printing

It is preferred that the size of printing (portion at which color L* value is different from portion that is white in color, where there is lettering, pictorial content, or the like) rendered at a display body in accordance with the present invention be such that either the height or the width thereof is not less than 0.2 mm but not greater than 100 mm. As it said that the resolving power of the human eye is on the order of 0.2 mm, when the size of lettering falls below 0.2 mm, the difference in color L* values will tend to be less than 1, making recognition of printing difficult. On the other hand, when the size of printing is above 100 mm, while this is preferred inasmuch as it facilitates recognition of printing, since applications of the present invention are predicated on display on packaging, this is not preferred because when the size of printing is too large it will cause the amount of information written on the packaging to be too small. It is more preferred that the size of printing be not less than 0.5 mm but not greater than 90 mm, and still more preferred that this be not less than 1 mm but not greater than mm.

1-7. Tensile Fracture Strength (Nonprinted Region)

It is preferred that nonprinted region(s) making up a display body in accordance with the present invention be such that tensile fracture strength in at least one direction among the 360° in a plane be not less than 40 MPa but not greater than 400 MPa. When tensile fracture strength is below 40 MPa, this is not preferred, because it will cause the display body to fracture easily under tension. It is more preferred that the lower limit of the range in values for tensile fracture strength be 50 MPa, and still more preferred that this be 60 MPa. On the other hand, while a tensile fracture strength that exceeds 400 MPa would be preferred in terms of mechanical strength, the level of the art of the present invention is such that the upper limit of the range in values therefor is MPa. As a practical matter, even where tensile fracture strength is 390 MPa, this will be adequate.

1-8. Thickness (Nonprinted Region)

It is preferred that thickness of the nonprinted region making up a display body in accordance with the present invention be not less than 5 μm but not greater than 200 μm. When this thickness is less than 5 μm, it will be difficult to achieve a total luminous transmittance at the nonprinted region of not greater than 50% even where the concentration(s) of laser printing pigment(s), described below, and/or other such white pigment(s) are increased. On the other hand, while increasing thickness of the nonprinted region will reduce total luminous reduction, which is preferred, because above 200 μm no further concealment improvement effect can be expected, the only result being to increase the chemical cost of the display body, that would not be preferred. It is more preferred that thickness of the nonprinted region be not less than 10 μm but not greater than 190 μm, and still more preferred that this be not less than 15 μm but not greater than 185 μm.

2. Display Body Constitution

At a display body in accordance with the present invention, it is required that at least one printing layer permitting printing as a result of causing color to change to black by means of laser irradiation be provided, and it is required that laser printing have been carried out at at least a portion of said printing layer. Essential and/or preferred constitution(s) of printing layer(s), and constitution(s) related to other layer(s), are described below.

2-1. Printing Layer

2-1-1. Types of Laser Printing Pigments, Amounts Thereof to be Added, and Methods for Adding Same So that a printing layer making up the present invention may be made laser-printable, laser printing pigment having functionality permitting change in color when acted on by laser irradiation must be added thereto. Because it is ordinarily the case that the plastic which makes up the display body will itself have almost no reaction to laser light, it is incapable of permitting printing by means of laser irradiation. Laser printing pigment can be made to undergo excitation by the energy from laser light, making it possible for printing to take place as a result of carburization of the surrounding plastic. Furthermore, besides the plastic carburization effect, there are laser printing pigments which, depending on the type thereof, may themselves change color and become black. Simple or complex action of this carburization effect and/or laser printing pigment color change effect makes it possible for printing to be carried out at the printing layer. From the standpointof print density, it is preferred that laser printing pigment(s) having both the plastic carburization effect and the effect whereby it itself changes color be selected. Furthermore, it is more preferred to select laser printing pigment(s) that themselves possess concealment.

As specific types of laser printing pigments, any of bismuth, gadolinium, neodymium, titanium, antimony, tin, aluminum, calcium, and barium—whether present alone or in oxide form—may be cited. Thereamong, it is preferred that the laser printing pigment(s) be titanium oxide, calcium carbonate, bismuth trioxide, antimony trioxide, and/or barium sulfate; more preferred that this/these be titanium oxide and/or calcium carbonate; and still more preferred that this be titanium oxide. Furthermore, it is preferred that laser printing pigment particle diameter be not less than 0.1 μM but not greater than 10 μm. When laser printing pigment particle diameter is less than 0.1 μm, there is a possibility that change in color when irradiated by a laser will no longer be adequate. On the other hand, when laser printing pigment particle diameter exceeds 10 μm, there is a concern that void content within the printing layer might exceed 80%. It is more preferred that laser printing pigment particle diameter be not less than 1 μm but not greater than 9 μm, and still more preferred that this be not less than 2 μm but not greater than 8 μm.

It is essential that laser printing pigment be added to the printing layer in an amount that is not less than 5 mass % but not greater than 50 mass %. When the amount of pigment that is added thereto is less than 5 mass %, this is not preferred because the print density produced by the laser will no longer be adequate. On the other hand, when the amount of pigment that is added thereto exceeds 50 mass %, this is not preferred, because not only will the relative decrease in the amount (volume) of plastic that is carburized cause print density to no longer be adequate, but also because there is a possibility that this would cause the tensile fracture strength of the display body to fall below 40 MPa. It is more preferred that the amount of laser printing pigment that is added thereto be not less than 7 mass % but not greater than 48 mass %, and still more preferred that this be not less than 9 mass % but not greater than 46 mass %.

As method for blending laser printing pigment therewithin, this may be added at any desired step(s) during manufacture of film(s) and/or resin(s) serving as raw material for the display body. For example, with regard to step(s) during manufacture of resin(s), methods in which a vented kneader extruder is used to cause plastic raw material and a slurry in which particles thereof are dispersed in solvent to be blended, methods in which a kneader extruder is used to cause dried particles thereof and plastic resin to be blended (made into masterbatch), and so forth may also be cited. Of these, methods in which masterbatch that contains laser printing pigment is used as film raw material are preferred.

2-1-2. Types of Plastic

With regard to the type of plastic that makes up the printing layer within the present invention, there is no particular limitation with respect thereto, it being possible to make free use thereamong without departing from the gist of the present invention. As the type of plastic, polyester, polyolefin, polyamide, and the like may be cited as examples.

As polyester, polyethylene terephthalate (PET), polybutylene terephthalate (PBT), polyethylene naphthalate (PEN), polytrimethylene terephthalate (PTT), polybutylene naphthalate (PBN), polylactic acid (PLA), polyethylene furanoate (PEF), polybutylene succinate (PBS), and so forth may be cited as examples. Moreover, in addition to the polyesters cited at the foregoing examples, it is also possible to use modified polyesters in which the monomer(s) at such acid site and/or diol site are altered. As acid-site monomer, isophthalic acid, 1,4-cyclohexanedicarboxylic acid, 2,6-naphthalene dicarboxylic acid, orthophthalic acid, and other such aromatic dicarboxylic acids, adipic acid, azelaic acid, sebacic acid, decanedicarboxylic acid, and other such aliphatic dicarboxylic acids, and alicyclic dicarboxylic acids may be cited as examples. Furthermore, as diol-site monomer, neopentyl glycol, 1,4-cyclohexanedimethanol, diethylene glycol, 2,2-diethyl-1,3-propanediol, 2-n-butyl-2-ethyl-1,3-propanediol, 2,2-isopropyl-1,3-propanediol, 2,2-di-n-butyl-1,3-propanediol, hexanediol, 1,4-butanediol, and other such long-chain diols, hexanediol and other such aliphatic dials, bisphenol A and other such aromatic-type diols, and so forth may be cited as examples. Moreover, as component making up polyester, this may include polyester elastomer(s) comprising ε-caprolactone, tetramethylene glycol, and/or the like. Regarding the polyester raw materials cited above, it is possible to use raw material in which a plurality of species of homopolyester, each of which has polymerized therein one species of carboxylic acid monomer and one species of diol monomer, are mixed (dry blended); and it is possible to use raw material in which two or more species of carboxylic acid monomer and/or two or more species of diol monomer are copolymerized. Furthermore, it is possible to use raw material in which homopolyester(s) and copolymerized polyester(s) are mixed.

While there is no particular limitation with respect to the intrinsic viscosity (IV) of polyester serving as raw material, it being possible for this be freely chosen as desired, it is preferred that this be 0.5 dL/g to 1.2 dL/g. When IV is less than 0.5 dL/g, because this causes molecular weight of the raw material to be too low, this will increase the tendency for fracture to occur during film formation, and increases the tendency for tensile fracture strength of the display body to fall below 40 MPa, and for other such problems to occur. On the other hand, when IV exceeds 1.2 dL/g, this is not preferred, because it will cause the resin pressure at the time of extruding operation(s) during film formation to be too high, which would tend to cause occurrence of deformation of filter(s) and so forth. It is more preferred that IV be not less than 0.55 dL/g but not greater than 1.15 dL/g, and still more preferred that this be not less than 0.6 dL/g but not greater than 1.1 dL/g.

As polyolefin, polypropylene (PP), polyethylene (PE), and so forth may be cited as examples. Where polypropylene is employed, there is no particular limitation with respect to stereoregularity, it being possible for this to be isotactic, syndiotactic, and/or atactic, it being possible for these to be present therein in any desired fractional percentage(s). Furthermore, where polyethylene is employed, there is no particular limitation with respect to the density (degree of branching) thereof, it being possible for this to be high density (HDPE), linear low density (LLDPE), and/or low density (LOPE). Furthermore, besides the foregoing homopolymers, raw materials in which two or more different types of monomers are copolymerized may be used; examples of monomers that may be used for copolymerization which may be cited including ethylene, α-olefins, and so forth; examples of α-olefins which may be cited including propylene, 1-butene, 1-pentene, 1-hexene, 1-heptene, 1-octene, I-nonene, 1-decene, 4-methyl-1-pentene, 4-methyl-1-hexene, and so forth. The type of copolymerization may be random copolymerization and/or block copolymerization. Moreover, besides the examples of raw materials cited above, polyolefin elastomer and/or ionomer may be employed.

While there is no particular limitation with respect to the melt flow rate (MFR) of polyolefin serving as raw material, it being possible for this be freely chosen as desired, it is preferred that this be 1 g/10 min to 10 g/10 min. When MFR is less than 1 g/10 min, this is not preferred because it would cause the melt viscosity of the raw material to be too high, as a result of which the resin pressure at the time of extruding operation(s) during film formation would be too high, which would tend to cause occurrence of deformation of filter(s) and so forth. On the other hand, when MFR is greater than 10 g/10 min, because this would cause molecular weight to become extremely low, there is a possibility that it would increase the tendency for fracture to occur during film formation, and/or that it would reduce resistance to blocking. It is more preferred that MFR be not less than 2 g/10 min but 8 g/10 min, and still more preferred that this be not less than 3 g/10 min but 7 g/10 min.

As polyamide, any one type of resin—or a raw material mixture in which two or more types thereof are mixed—selected from among polycapramide (nylon 6), polyhexamethylene adipamide (nylon 66), caprolactam/lauryl lactam copolymer (nylon 6/12), caprolactam/hexamethylene diammonium adipate copolymer (nylon 6/66), ethylene ammonium adipate/hexamethylene diammonium adipate/hexamethylene diammonium sebacate copolymer (nylon 6/66/610), polymers of meta-xylylenediamine and adipic acid (MXD-6), hexamethylene isophthalamide/terephthalamide copolymer (amorphous nylon), and so forth may be cited as examples. Furthermore, an adhesion improvement layer may be provided at the surface of a film comprising any of the examples of plastics cited above. As material for the adhesion improvement layer, acrylic, a water-soluble or water-dispersible polyester, a hydrophobic polyester in which acrylic is graft copolymerized, and so forth may be cited as examples.

It is preferred that the relative viscosity (RV) of polyamide serving as raw material be not less than 2.2 but not greater than 4. When RV is less than 2.2, crystallization rate may be too high, and there may be a tendency for fracture or the like to occur when stretching is carried out during film forming operations. On the other hand, when RV exceeds 4, this is not preferred, as the load on the extruder will be too high, and there will be increased tendency for occurrence of filter deformation and the like. It is more preferred that RV be not less than 2.3 but not greater than 3.9. and still more preferred that this be not less than 2.4 but not greater than 3.8. Note that "relative viscosity" in the context of the present invention means the value measured at 25° C. using a solution in which 0.5 g of polymer has been dissolved in 50 ml of 97.5% sulfuric acid.

With regard to the type(s) of plastic making up the laser printing layer, among those cited above, it is preferred that this or these be polyester, polypropylene, and/or polyethylene, and it is particularly preferred that this or these be polyester and/or polypropylene.

2-1-3. Void Forming Agent

To improve laser absorption efficiency, it is preferred that a printing layer in accordance with the present invention contain void(s) as explained above at "1-4. Void Content". Methods for causing void(s) to be contained thereby include causing void forming agent to be mixed within plastic, increasing stretching rate at the time that the film is stretched and causing microdelamination to occur within plastic layer(s), and so forth, it being possible to freely choose from thereamong without departing from the gist of the present invention. From the standpoint of facilitating control of void content and stabilizing film formation, mixture of void forming agent is preferred. As void forming agent, it is possible to freely choose from among foaming agents that cause production of gas, organic and/or inorganic particles that are immiscible with plastic (hereinafter sometimes referred to as "base resin") serving as base for the printing layer, and so forth. Thereamong, mixture of organic and/or inorganic particles that are immiscible with the base resin is a preferred mode. In such case, by causing the film to be stretched while in a state in which immiscible particles are present within the base resin, void(s) are generated as a result of partial delamination of base resin centered on the particles. Preferred requirements for the stretching method are described below.

Where organic-type void forming agent is used, so as to cause this to be immiscible with the base resin, a resin of a type having a different chemical structure (primary structure) will be required. For example, where polyester is used as the base resin, polyolefin, polyamide, polystyrene, acrylic, and the like may be cited as void forming agents that might be used. Resins mentioned above at "2-1-2. Types of Plastic" and below at "2-2. Layer(s) Other than Laser Printing Layer(s)" may be cited as examples of such void forming agents.

Where inorganic-type void forming agent is to be used, this might be chosen from among known void forming agents, it being possible to cite silica, calcium carbonate, and the like as examples. Because calcium carbonate also acts as a laser pigment, the choice thereof is preferred in light of the gist of the present invention which is to improve laser print density.

It is preferred that void forming agent be added to the printing layer in an amount that is not less than 5 mass % but not greater than 50 mass %. When the amount of void forming agent blended therein is less than 5 mass %, this is not preferred, because there is a possibility that void content (described below) will be less than 10 vol %. On the other hand, when the amount of void forming agent blended therein exceeds 50 mass %, this is not preferred, because it will increase the tendency for void content to exceed 80 vol %. It is more preferred that the amount of void forming agent blended therein be not less than 10 mass % but not greater than 45 mass %, and still more preferred that this be not less than 15 mass % but not greater than 40 mass %.

It is preferred that void forming agent particle diameter be not less than 1 μm but not greater than 10 μm. When void forming agent particle diameter is less than 1 μm, this is not preferred, because there is a possibility that it will cause void content to be less than 10 vol % When void forming agent particle diameter exceeds 10 μm, this is not preferred, because it will increase the tendency for void content to exceed 80 vol % It is more preferred that void forming agent particle diameter be not less than 1.5 μm but not greater than 9.5 μm, and still more preferred that this be not less than 2 μm but not greater than 9 μm.

As method for causing void forming agent added to the laser printing layer to be blended therewithin, this may be added at any desired step(s) during manufacture of the plastic raw material, and it is possible to adopt a method that is the same as at the foregoing "2-1-1. Types of Laser Printing Pigments, Amounts Thereof To Be Added, and Methods for Adding Same".

2-1-6. Additives Other than Laser Printing Pigment

Any of various additives, e.g., e.g., waxes, antioxidants, antistatic agents, crystal nucleating agents, viscosity-lowering agents, thermal stabilizers, colorant pigments, antistaining agents, ultraviolet light absorbers, and/or the like, may be added as necessary within printing layer(s) making up the display body of the present invention. Furthermore, where a printing layer is a surfacemost layer, it is preferred that microparticles serving as lubricant for improving lubricity be added thereto. Any desired microparticles may be chosen. For example, as inorganic-type microparticles, silica, alumina, kaolin, white lead, titanium white, zeolite, zinc oxide, lithopone, and so forth may be cited; as organic-type microparticles, acrylic particles, melamine particles, silicone particles, crosslinked polystyrene particles, carbon black, iron oxide, and so forth may be cited. Average particle diameter of microparticles when measured by means of a Coulter counter may be chosen as appropriate as needed within the range 0.05 μm to 3.0 μm. It is preferred that the lower limit of the range in values for the fractional amount of microparticles present therein be 0.01 mass %, more preferred that this be 0.015 mass %, and still more preferred that this be 0.02 mass %. Below 0.01 mass %, there may be reduction in lubricity. It is preferred that the upper limit of the range in values be 1 mass %, more preferred that this be 0.2 mass %, and still more preferred that this be 0.1 mass %. Greater than 1 mass % is not preferred, because there can be reduction in transparency.

As method for causing particles to be blended within the laser printing layer, these may be added at any desired step(s) during manufacture of the plastic raw material, and it is possible to adopt a method that is the same as at the foregoing "2-1-1. Types of Laser Printing Pigments, Amounts Thereof To Be Added, and Methods for Adding Same".

2-2. Layer(s) Other than Printing Layer(s)

A display body in accordance with the present invention may have layer(s) other than printing layer(s). As layered constitution of the display body, single-layer in which there is only a printing layer, a constitution in which there are two layers of two species and in which a layer other than the printing layer is laminated on one side, three layers of two species in which the printing layer is straddled to either side by layers that are the same and that are other than the printing layer, three layers of three species in which it is straddled by layers that are different, and so forth may be cited as examples. Based upon consideration of the fact that, besides display function, mechanical strength, adhesive characteristics, barrier properties, and various other functions will be sought in a display material, and also the fact that the laser printing layer will undergo etching and the thickness thereof will be reduced, it is ordinarily preferred that other layer(s) having respective function(s) be laminated therewith. While it is possible for any number of layer(s) other than laser printing layer(s) to be laminated therewith, so that thickness of the display body might be made to be not greater than 200 μm, two layers of two species, three layers of two species, or three layers of three species is preferred. Thereamong, so as to protect laser printing layer(s) from external stimulation and the like, a constitution in which there are three layers of three species or three layers of two species and in which surfacemost layer(s) are other layer(s) is a more preferred mode.

As the present invention is predicated on packaging, and as packaging is ordinarily constituted as a result of adhesion, it is preferred that function(s) of such other layer(s) be such that they have adhesiveness (hereinafter, a layer having adhesiveness is sometimes referred to simply as an "adhesion layer"). As adhesion layer, there is no particular limitation with respect thereto so long as it has adhesive characteristics, it being possible to use any among those which are conventionally known without departing from the gist of the present invention. Heat seal layers which are such that adhesive characteristics are made manifest as a result of heat, and pressure sensitive adhesive (tacky) layers which have adhesive characteristics at normal temperature, may be cited as examples.

As the type of plastic that makes up the heat seal layer, polyester, polyolefin, polyamide, and the like may be cited as examples.

As polyester, polyethylene terephthalate (PET), polybutylene terephthalate (PBT), polyethylene naphthalate (PEN), polytrimethylene terephthalate (PTT), polybutylene naphthalate (PBN), polylactic acid (PLA), polyethylene furanoate (PEF), polybutylene succinate (PBS), and so forth may be cited as examples. Moreover, in addition to the polyesters cited at the foregoing examples, it is also possible to use modified polyesters in which the monomer(s) at such acid site and/or diol site are altered. As acid-site monomer, isophthalic acid, 1,4-cyclohexanedicarboxylic acid, 2,6-naphthalene dicarboxylic acid, orthophthalic acid, and other such aromatic dicarboxylic acids, adipic acid, azelaic acid, sebacic acid, decanedicarboxylic acid, and other such aliphatic dicarboxylic acids, and alicyclic dicarboxylic acids may be cited as examples. Furthermore, as diol-site monomer, neopentyl glycol, 1,4-cyclohexanedimethanol, diethylene glycol, 2,2-diethyl-1,3-propanediol, 2-n-butyl-2-ethyl-1,3-propanediol, 2,2-isopropyl-1,3-propanediol, 2,2-d i-n-butyl-1,3-propanediol, hexanediol, 1,4-butanediol, and other such long-chain diols, hexanediol and other such aliphatic diols, bisphenol A and other such aromatic-type diols, and so forth may be cited as examples. Moreover, as component making up polyester, this may include polyester elastomer(s) comprising ε-caprolactone, tetramethylene glycol, and/or the like. Regarding the polyester raw materials cited above, it is possible to use raw material in which a plurality of species of homopolyester, each of which has polymerized therein one species of carboxylic acid monomer and one species of diol monomer, are mixed (dry blended); and it is possible to use raw material in which two or more species of carboxylic acid monomer and/or two or more species of diol monomer are copolymerized. Furthermore, it is possible to use raw material in which homopolyester(s) and copolymerized polyester(s) are mixed.

As polyolefin, polypropylene (PP), polyethylene (PE), and so forth may be cited as examples. Where polypropylene is employed, there is no particular limitation with respect to stereoregularity, it being possible for this to be isotactic, syndiotactic, and/or atactic, it being possible for these to be present therein in any desired fractional percentage(s). Furthermore, where polyethylene is employed, there is no particular limitation with respect to the density (degree of branching) thereof, it being possible for this to be high density (HDPE), linear low density (LLDPE), and/or low density (LDPE). Furthermore, besides the foregoing homopolymers, raw materials in which two or more different types of monomers are copolymerized may be used; examples of monomers that may be used for copolymerization which may be cited including ethylene, α-olefins, and so forth; examples of α-olefins which may be cited including propylene, 1-butene, 1-pentene, 1-hexene, 1-heptene, 1-octene, 1-nonene, 1-decene, 4-methyl-1-pentene, 4-methyl-1-hexene, and so forth. The type of copolymerization may be random copolymerization and/or block copolymerization. Moreover, besides the examples of raw materials cited above, polyolefin elastomer and/or ionomer may be employed.

While there is no particular limitation with respect to the melt flow rate (MFR) of polyolefin serving as raw material, it being possible for this be freely chosen as desired, it is preferred that this be 1 g/10 min to 10 g/10 min. When MFR is less than 1 g/10 min, this is not preferred because it would cause the melt viscosity of the raw material to be too high, as a result of which the resin pressure at the time of extruding operation(s) during film formation would be too high, which would tend to cause occurrence of deformation of filter(s) and so forth. On the other hand, when MFR is greater than 10 g/10 min, because this would cause molecular weight to become extremely low, there is a possibility that it would increase the tendency for fracture to occur during film formation, and/or that it would reduce resistance to blocking. It is more preferred that MFR be not less than 2 g/10 min but 8 g/10 min, and still more preferred that this be not less than 3 g/10 min but 7 g/10 min.

As polyamide, any one type of resin—or a raw material mixture in which two or more types thereof are mixed—selected from among polycapramide (nylon 6), polyhexamethylene adipamide (nylon 66), caprolactam/lauryl lactam copolymer (nylon 6/12), caprolactam/hexamethylene diammonium adipate copolymer (nylon 6/66), ethylene ammonium adipate/hexamethylene diammonium adipate/hexamethylene diammonium sebacate copolymer (nylon 6/66/610), polymers of meta-xylylenediamine and adipic acid (MXD-6), hexamethylene isophthalamide/terephthalamide copolymer (amorphous nylon), and so forth may be cited as examples. Furthermore, an adhesion improvement layer may be provided at the surface of a film comprising any of the examples of plastics cited above. As material for the adhesion improvement layer, acrylic, a water-soluble or water-dispersible polyester, a hydrophobic polyester in which acrylic is graft copolymerized, and so forth may be cited as examples.

It is preferred that the lower limit of the range in values for relative viscosity (RV) of polyamide serving as raw material be 2.2, and more preferred that this be 2.3. If the foregoing is less than this, crystallization rate may be too high and biaxial stretching may be difficult. On the other hand, it is preferred that the upper limit of the range in values for the RV of polyamide be 4, and more preferred that this be 3.9. If the foregoing is exceeded, there is a possibility that the load or the like on the extruder will become too high and/or that productivity will decrease. Note that "relative viscosity" in the context of the present invention means the value measured at 25° C. using a solution in which 0.5 g of polymer has been dissolved in 50 ml of 97.5% sulfuric acid.

As the type of plastic that makes up the pressure sensitive adhesive layer, polyester, polyolefin, polystyrene, acrylic, and the like may be cited as examples, those having a glass transition temperature Tg which is below room temperature (in the vicinity of 25° C.) being particularly preferred.

As examples of polyester, as monomer(s) that will permit Tg to be lowered, it is preferred that saturated carboxyl acid component and/or saturated diol component be used. As saturated carboxyl acid, adipic acid, azelaic acid, sebacic acid, decanedicarboxylic acid, 1,4-cyclohexanedicarboxylic acid, and so forth may be cited. Thereamong, adipic acid and azelaic acid are preferred. As saturated diol component, ethylene glycol, diethylene glycol, 1,3-propanediol, 2,2-diethyl-1,3-propanediol, 1,4-butanediol, and other such long-chain diols, and hexanediol and other such aliphatic diols may be cited. Thereamong, use of diethylene glycol, 1,3-propanediol, and/or 1,4-butanediol is preferred. Moreover, as component making up polyester-type resin, polyester elastomer(s) comprising t-caprolactone, tetramethylene glycol, and/or the like may be used. Polyester elastomer may be favorably used because it is effective in lowering Tg.

As polyolefinic substances, polyolefinic elastomers may be cited as examples. As polyolefinic elastomers, ethylene-propylene copolymer, ethylene-1-butene copolymer, ethylene-1-hexene copolymer, ethylene-1-octene copolymer, ethyl ene-4-methyl-1-pentene copolymer, ethylene-propylene-1-butene copolymer, ethylene-propylene-1-hexene copolymer, ethylene-1-butene-1-hexene copolymer, propylene-1-butene copolymer, propylene-1-hexene copolymer, propylene-1-octene copolymer, propylene-4-methyl-1-pentene copolymer, propylene-1-butene-1-hexene copolymer, propylene-1-butene-4-methyl-1-pentene copolymer, and so forth may be cited as examples. Furthermore, small amount(s) of SBS, SEBS, and/or other such styrenic elastomer(s) may be added thereto.

As polystyrenes, polystyrenic elastomers may be cited as examples. As polystyrenic elastomers, polymers in which an aromatic alkenyl compound and a conjugated diene have been block copolymerized may be cited as examples; examples of aromatic alkenyl compounds which may be cited including styrene, tert-butylstyrene, α-methylstyrene, p-methylstyrene, p-ethylstyrene. divinylbenzene, 1,1-diphenylethylene, vinylnaphthalene, vinylanthracene, N,N-dimethyl-p-aminoethylstyrene, N,N-diethyl-p-aminoethylstyrene, vinylpyridine, and so forth; examples of conjugated diene monomers which may be cited including 1,3-butadiene, 1,2-butadiene, isoprene, 2,3-dimethyl-butadiene, 1,3-pentadiene, 2-methyl-1,3-butadiene, 2-methyl-1,3-pentadiene, 1,3-hexadiene, 1,3-cyclohexadiene, 4,5-diethyl-1,3-octadiene, 3-butyl-1,3-octadiene, myrcene, chloroprene, and other such diolefins.

Acrylic may be a copolymer of acrylic monomer or a copolymer of acrylic monomer and a monomer other than that which is capable of being copolymerized. As acrylic monomer, such copolymer may be derived from monomers, examples of which that may be cited including (meth) acrylate, methyl (meth)acrylate, ethyl (meth)acrylate, propyl (meth)acrylate, isopropyl acrylate, n-butyl (meth)acrylate, isobutyl acrylate, t-butyl (meth)acrylate, n-amyl (meth)acrylate, isoamyl (meth)acrylate, n-hexyl (meth)acrylate, 2-ethylhexyl (meth)acrylate, n-octyl (meth)acrylate, decyl (meth) acrylate, octadecyl (meth)acrylate, lauryl (meth)acrylate, stearyl (meth)acrylate, and other such (meth)acrylic acid alkyl esters; cyclohexyl (meth)acrylate, benzyl (meth)acrylate, phenyl (meth)acrylate, and other such (meth)acrylic acid cyclic esters; allyl (meth)acrylate, 1-methylallyl (meth) acrylate, 2-methylallyl(meth)acrylate, and other such vinyl (meth)acrylates and other such unsaturated-group-containing (meth)acrylic acid esters; glycidyl (meth)acrylate, (3,4-epoxycyclohexyl)methyl (meth)acrylate, and other such heterocycle-containing (meth)acrylic acid esters; N-methylaminoethyl (meth)acrylate, N-tributylaminoethyl (meth)acrylate, N,N-dimethylaminoethyl (meth)acrylate, and other such amino-group containing (meth)acrylic acid esters; 3-methacryloxypropyltrimethoxysilane and other such alkoxysilyl-group-containing (meth)acrylic acid esters; methoxyethyl (meth)acrylate, ethylene oxide adduct of (meth)acrylic acid, and other such (meth)acrylic acid derivatives; pertluoroethyl (meth)acrylate, pertluorobutyl (meth) acrylate, and other such (meth)acrylic acid perfluoroalkyl esters; trimethylolpropane tri(meth)acrylate and other such polyfunctional (meth)acrylic acid esters; and so forth. Furthermore, as monomers other than acrylic that are capable of being copolymerized, as monomers having at least one carboxyl group at a radical polymerizable unsaturated group, maleic acid, maleic anhydride, itaconic acid, itaconic anhydride, and so forth may be cited as examples. Furthermore, besides radical polymerizable unsaturated groups, as monomers having at least one hydroxyl group, 2-hydroxyethyl (meth)acrylate, 2-hydroxypropyl (meth)acrylate, 2-hydroxybutyl (meth)acrylate, diethylene glycol mono(meth) acrylate, and so forth may be cited as examples. Moreover, as vinyl monomers and the like which are capable of copolymerization with acrylic monomer, styrene, α-styrene, and other such aromatic vinyl-type monomers; vinyltrimethoxysilane and other such trialkyloxysilyl-group-containing vinyl monomers; acrylonitrile, methacrylonitrile, and other such nitrile-group-containing vinyl-type monomers; acrylamide- and methacrylamide-group-containing vinyl-type monomers; vinyl acetate, vinyl versatate, and other such vinyl esters and so forth may be cited as examples.

Using plastic of any of the types described above by way of example as raw material, this may be used as desired as film formed so as to be unstretched, uniaxially stretched, or biaxially stretched, or as a coating in which this is dispersed in solvent or the like. Where this is formed into film, it is preferred for achievement of adhesive characteristics that this be unstretched or uniaxially stretched, unstretched being more preferred.

To cause the printing characteristics and/or lubricity of surface(s) thereof to be made satisfactory, it is possible for a display body in accordance with the present invention to be made to comprise layer(s) that have undergone corona treatment, coating treatment, flame treatment, and/or the like, it being possible for same to be comprised thereby as desired without departing from the requirements of the present invention.

Furthermore, with the goal of improving the design characteristics thereof, the display material of the present invention may be provided with lettering and/or pictorial content other than that which is printed by means of laser. As material for constituting such lettering and/or pictorial content, gravure ink, flexographic ink, and/or other such known substance(s) may be used. Regarding the number of printing layer(s), there may be one such layer or there may be a plurality of such layers. So as to be able to improve design characteristics by printing a plurality of colors, it is preferred that there be printing layer(s) that comprise a plurality of layers. There will be no objection regardless of whether printing layer(s) are disposed at surfacemost layer(s) or at intermediate layer(s).

3. Display Body Manufacturing Conditions
3-1. Film Manufacturing Conditions
3-1-1. Mixture and Supply of Raw Materials In manufacturing a display body in accordance with the present invention, laser printing pigment must be added as described above at "2-1-1. Types of Laser Printing Pigments, Amounts Thereof To Be Added, and Methods for Adding Same", and it is moreover preferred that void forming agent be added as described at "2-1-3. Void Forming Agent". It is preferred that void(s) be such that raw material which is immiscible with the base resin making up the printing layer be employed.

Causing two or more species of raw material to be mixed and fed to an extruder in this fashion will tend to cause occurrence of variation (segregation) in the supply of raw materials. To prevent such variation, it is preferred that agitator(s) be installed at hopper(s) and plumbing immediately above extruder(s), that plumbing (inner piping) be inserted at interior(s) of hopper(s) immediately above extruder(s) filled with base resin and that laser printing pigment and/or void forming agent be supplied thereby, that tapered collars for lowering granular pressure of raw materials be installed at respective raw material hoppers, and/or that other such strategy or strategies be adopted to carry out melt extrusion.

3-1-2. Melt Extrusion

A display body in accordance with the present invention may be obtained by causing raw materials supplied at the foregoing "3-1-1. Mixture and Supply of Raw Materials" to be melt extruded by extruder(s) to form unstretched film, and causing this to undergo the prescribed operations indicated below. Note that where the film comprises printing layer(s) and other layer(s), the respective layers may be laminated with any desired timing. Where lamination is carried out during melt extrusion (coextrusion), it is preferred that a method be adopted in which the resins serving as raw materials for the respective layers are melt extruded at respectively different extruders, and a feedblock or the like is used partway along the resin flow paths to achieve joining thereof. Where lamination is carried out after stretching, it is preferred that lamination in which respectively separately formed films are affixed to each other by means of adhesive and/or extruded lamination in which molten plastic is made to flow and be laminated to surface layer(s) of laminated and/or single film(s) be adopted. From the standpoint of productivity, methods in which the respective layers are laminated before stretching is carried out are preferred.

As method for melt extruding resin raw material, known methods may be employed, methods employing extruder(s) equipped with barrel(s) and screw(s) being preferred. It is preferred that a hopper dryer, paddle dryer, or other such dryer and/or vacuum dryer be used in advance to cause raw material (polyester or the like) that might otherwise decompose due to the effect of moisture when molten to be dried until the moisture content thereof is not greater than 100 ppm, more preferably not greater than 90 ppm, and still more preferably not greater than ppm. After the raw material has been dried in such fashion, the resin that has been melted by extruder(s) is quenched, as a result of which it is possible to obtain unstretched film. With respect to extrusion, this may be carried out by adopting the T die method, tubular method, and/or any other such known method as desired.

Furthermore, it is preferred that the shear rate at the time that resin is expelled from the region of the die orifice be not less than 100 sec$^{-1}$ but not greater than 1500 sec$^{-1}$ Because causing shear rate to be high will reduce the dispersal diameter of organic or inorganic particles serving as void forming agent, causing shear rate to be not less than 100 sec$^{-1}$ will facilitate achievement of a void height that is not greater than 8 μm. On the other hand, when shear rate exceeds 1500 sec$^{-1}$, this is not preferred, not only because there is a possibility this would cause void height to be less than but also because this would cause resin viscosity during extrusion to become extremely low, and would make it impossible to achieve stable film formation due to fracture and so forth. It is more preferred that shear rate be not less than 110 sec$^{-1}$ but not greater than 1490 sec$^{-1}$, and still more preferred that this be not less than 120 sec$^{-1}$ but not greater than 1480 sec$^{-1}$. The shear rate at the die outlet may be determined from Formula 1, below.

$$\gamma = 6Q/(W \times H^2) \quad \text{Formula 1}$$

γ=Shear rate (sec$^{-1}$)
Q=Amount of raw material expelled from extruder (cm$^3$/sec)
W=Width of opening at die outlet (die width) (cm)
H=Length of opening at die outlet (lip gap) (cm)

By thereafter quenching the film that is molten due to having been extruded, it is possible to obtain unstretched film. As method for quenching molten resin, a method on which the molten resin from the orifice fixture is cast onto a rotating drum where it is quenched and allowed to solidify to obtain a substantially unoriented resin sheet might be favorably adopted. It is preferred that the speed (draft ratio) with which molten film at this time is taken up when cast onto the rotating drum be not less than 0.5 but not greater than 25. Increasing the draft ratio will reduce the dispersal diameter of organic or inorganic particles serving as void forming agent. Causing the draft ratio to be not less than 0.5 will facilitate achievement of a void height that is not greater than 8 prn. On the other hand, when the draft ratio exceeds 25, this is not preferred, because it will tend to cause void height to fall below 1 μm. It is more preferred that draft ratio be not less than 1 but not greater than 24.5, and still more preferred that this be not less than 1.5 but not greater than 24.

$$V = \{Q/(W \times H)\}/V_0 \quad \text{Formula 2}$$

V=Draft ratio
Q=Amount of raw material expelled from extruder (cm$^3$/sec)
W=Width of opening at die outlet (cm)
H=Length of opening at die outlet (lip gap) (cm)
$V_0$=Takeup speed at cooling drum (cm/sec)

The film serving as printing layer may be formed in accordance with any of the following techniques: unstretched; uniaxially stretched (stretching in at least one of either the vertical (machine) direction or the horizontal (transverse) direction); biaxially stretched. However, based upon consideration of the fact that it is a preferred mode of the void(s) employed in a printing layer in accordance with the present invention that they be produced as a result of stretching, uniaxial stretching is preferred, and biaxial stretching is more preferred. While the description that follows is given with a focus on the sequential biaxial stretching method employing machine direction stretching—transverse direction stretching in which stretching is first carried out in the machine direction and stretching is subsequently carried out in the transverse direction, there is no objection to transverse direction stretching—machine direction stretching in which the order is reversed, as this will merely cause a change in the principal orientation direction. There would moreover be no objection to the simultaneous biaxial stretching method in which stretching in the machine direction and transverse direction are carried out simultaneously.

3-1-3. First (Machine Direction) Stretching

Stretching in the first direction (vertical or machine direction) may be carried out by causing the film to be fed into a machine direction stretching device in which a plurality of groups of rollers are arranged in continuous fashion. In carrying out machine direction stretching, it is preferred that preheating roller(s) be used to carry out preheating of the film. The preheating temperature is set so as to be between glass transition temperature Tg and melting point Tm+50° C., as determined based on the Tg of the plastic that makes up the film. When the preheating temperature is less than Tg, this is not preferred because stretching will be difficult at the time that stretching in the machine direction is carried out, and there will be a tendency for fracture to occur. And when the heating temperature is higher than Tm+50° C., this is not preferred because the film will tend to stick to the rollers, and there will be a tendency for the film to become wound thereabout.

When film reaches between Tg and Tm+50° C., stretching in the machine direction is carried out. The stretching ratio in the machine direction should be not less than 1× but not greater than 5×. As 1× would mean that there is no stretching in the machine direction, the stretching ratio in the machine direction should be 1× to obtain film which is uniaxially stretched in the transverse direction, and the stretching ratio in the machine direction should be not less than 1.1× to obtain biaxially stretched film. Causing the machine direction stretching ratio to be not less than 1.1× is preferred, because this will cause void(s) to be formed within the printing layer. While there is no objection to employment of any value as the upper limit of the range in values for the stretching ratio in the machine direction, as too great a stretching ratio in the machine direction will increase the tendency for fracture to occur during the stretching in the transverse direction that follows, it is preferred that this be not greater than 10×. It is more preferred that the stretching ratio in the machine direction be not less than 1.2× but not greater than 9.8×, and still more preferred that this be not less than 1.4× but not greater than 9.6×.

3-1-4. Second (Transverse Direction) Stretching

Following first (machine direction) stretching, it is preferred that stretching in the transverse direction be carried out at a stretching ratio of on the order of 2× to 13× at between Tg and Tm+50° C. while in a state such that the two ends in the transverse direction (the direction perpendicular to the machine direction) of the film are gripped by clips within a tenter. Before carrying out stretching in the transverse direction, it is preferred that preheating be carried out, in which case preheating should be carried out until the temperature at the display material or packaging surface reaches between Tg and Tm+50° C.

It is more preferred that the stretching ratio in the transverse direction be not less than 2.2× but not greater than 12.8×, and still more preferred that this be not less than 2.4× but not greater than 12.6×. Note that because the stretching rates are different for stretching in the machine direction versus stretching in the transverse direction (the stretching rate is higher for stretching in the machine direction), the preferred stretching ratio ranges are different. It is preferred that the area ratio which is the product of the machine direction stretching and transverse direction stretching ratios be not less than 2.2× but 64×.

Following stretching in the transverse direction, it is preferred that the film be made to pass through an intermediate zone in which no procedure such as would cause it to be actively heated is performed. Relative to the zone in which stretching in the transverse direction is carried out at the tenter, because the temperature at the final heat treatment zone that follows is high, failure to establish an intermediate zone would cause heat (hot air itself and/or radiated heat) from the final heat treatment zone to flow into the operation at which stretching in the transverse direction is carried out. If this were to happen, because the temperature in the zone in which stretching in the transverse direction is carried out would not be stable, there would be occurrence of variation in physical properties. It is therefore preferred that following stretching in the transverse direction the film be made to pass through an intermediate zone until a prescribed time has elapsed before final heat treatment is performed. It is important when in this intermediate zone, where rectangular strips are made to hang down from above while the film is kept from passing therethrough, that hot air from the final heat treatment zone and from the zone in which stretching in the transverse direction is carried out as well as any concomitant flow that would otherwise accompany movement of the film be blocked, so that those strips are made to hang down from above in almost perfectly vertical fashion. It will be sufficient if the time of passage through the intermediate zone is on the order of 1 second to 5 seconds. When the time is less than 1 second, length of time in the intermediate zone will be insufficient, and there will be inadequate heat blocking effect. On the other hand, while longer times in the intermediate zone are preferred, because too long a time therein would result in increased equipment size, on the order of 5 seconds will be sufficient.

3-1-5. Heat Treatment

Following passage through the intermediate zone, it is preferred at the heat treatment zone that heat treatment be carried out at between 100° and 280° C. Because heat treatment promotes crystallization of the film, not only will this make it possible to reduce any thermal shrinkage that occurred during stretching operation(s), but this will also tend to increase tensile fracture strength. When heat treatment temperature is less than 100° C., this is not preferred, because it would tend to increase the thermal shrinkage of the film. On the other hand, when heat treatment temperature exceeds 280° C., this is not preferred, because the film will tend to melt, and tensile fracture strength will tend to be reduced. It is more preferred that the heat treatment temperature be between 110° and 270° C., and still more preferred that this be between 120° and 260° C.

It is preferred that the time of passage through the heat treatment zone be not less than 2 seconds but not greater than 20 seconds. When the time of passage therethrough is 2 seconds or less, heat treatment will be meaningless because the film will pass through the heat treatment zone without the surface temperature of the film having reached the temperature setpoint. Because the longer the time of passage therethrough the greater will be the effect of heat treatment, it is more preferred that this be not less than 5 seconds. But because attempting to increase the length of time of passage therethrough would result in increased equipment size, as a practical matter it will be adequate if this is not greater than 20 seconds.

During heat treatment, decreasing the distance between tenter clips (causing relaxation in the transverse direction) by some desired ratio will make it possible to reduce thermal shrinkage in the transverse direction. For this reason, it is preferred during final heat treatment that the film be made to undergo relaxation in the transverse direction within the range not less than 0% but not greater than 10% (a percent relaxation of 0% indicating that the film is not made to undergo relaxation). Whereas the higher the percent relaxation in the transverse direction the greater will be the reduction in shrinkage in the transverse direction, as the upper limit of the range in values for the percent relaxation (shrinkage of film in the transverse direction immediately following stretching in the transverse direction) is determined by the raw materials used, the conditions under which stretching in the transverse direction was carried out. and the heat treatment temperature, it will not be possible to cause the film to undergo relaxation to the point where this would be exceeded. At a laser printing layer making up a display material in accordance with the present invention, the upper limit of the range in values for the percent relaxation in the transverse direction is 10%. Furthermore, during heat treatment, it is also possible to decrease the distance between clips in the machine direction by some desired ratio (to cause relaxation in the machine direction).

3-1-6. Cooling

Following passage through the heat treatment zone, it is preferred at the cooling zone that a cooling airstream at not less than 10° C. but not greater than C be used to carry out cooling of the film for a passage time therethrough of not less than 2 seconds but not greater than 20 seconds.

By thereafter causing the film to be rolled up as portions cut from the two ends thereof are removed therefrom, a film roll is obtained.

3-2. Lamination Methods Other than Coextrusion

When manufacturing a display body in accordance with the present invention, and where, following film formation film formation of printing layer(s) in accordance with a method as described above at "3-1. Film Manufacturing Conditions", lamination with the foregoing "2-2. Layer(s) Other than Printing Layer(s)" is carried out, there being no particular limitation with respect to the lamination method, adjacent films may be made to mutually adhere through use of conventionally known dry lamination and/or extruded lamination. Where dry lamination is employed, commercially available adhesives for dry lamination may be used. Representative examples include Dicdry (registered trademark) LX-703VL manufactured by DIC Corporation; KR-90 manufactured by DIC Corporation; Takenate (registered trademark) A-4 manufactured by Mitsui Chemicals, Inc.; Takelac (registered trademark) A-905 manufactured by Mitsui Chemicals, Inc.; and so forth. Where extruded lamination is employed, plastic that will constitute a layer other than a printing layer is made to melt and adhere over a printing layer, and an anchor coat may also be provided thereat in advance so as to increase adhesion between layers.

3-3. Laser Printing Conditions

As types (wavelengths) of lasers that may be used to carry out printing in accordance with the present invention, $CO_2$ lasers (10600 nm), YAG lasers (1064 nm), $YVO_4$ lasers (1064 nm), fiber lasers (1064 nm and 1090 nm), green lasers (532 nm), and UV lasers (355 nm) may be cited. Thereamong, while there is no particular limitation with respect to the type of laser employed at the display material of the present invention, $CO_2$ lasers being often used for ablation of plastic, as they are often used for a purpose that is different from printing which is the intention of the present invention, they are not preferred as a laser source. As laser source, YAG lasers, $YVO_4$ lasers, fiber lasers, green lasers, and UV lasers are preferred, YAG lasers, fiber lasers, and UV lasers being more preferred. Commercially available devices may be used for laser printing, representative examples of which that may be cited including the LM-2550 (YAG laser) manufactured by Brother Industrial Printing, Ltd.; the MX-Z2000H-V1 (fiber laser) manufactured by Omron Corporation; the 8028 Trotec Speedy 100 flexx (fiber laser) manufactured by Trotec; the M D-X1000 ($YVO_4$ laser) and the MD-U1000C (UV laser) manufactured by Keyence Corporation; and so forth.

Regarding laser printing conditions, while the specifications and conditions that may be established will differ for each device manufacturer and for each model, and will moreover differ depending on the film on which printing is to be carried out, for which reason it is impossible to speak to every situation, the following will apply where the MD-U1000C (UV laser; wavelength 355 nm) manufactured by Keyence Corporation is employed by way of example.

It is preferred that laser power be such that output is not less than 20% but not greater than 80% of the maximum 13 W specified for the device. When output is less than 20%, this is not preferred, because print density will be reduced, and visual perceivability will be reduced. When output is 80% or greater, this is not preferred. because this will cause formation of holes in the display body. It is more preferred that output be not less than 25% but not greater than 75%, and still more preferred that this be not less than 30% but not greater than 70%. It is preferred that pulse frequency be not less than 10 kHz but not greater than 100 kHz. When frequency falls below 10 kHz, this is not preferred, because the laser energy per irradiation will be high, and there will be a tendency for the fractional decrease in thickness at the printed region to rise above 80 vol %. Conversely, when frequency rises above 100 kHz, although this will facilitate causing the fractional decrease in thickness at the printed region to be not greater than 80 vol %, there are situations in which this will make it difficult to achieve a difference in color L* values at the printed region that is not less than 1. It is more preferred that this be not less than 15 kHz but not greater than 95 kHz, and still more preferred that this be not less than 20 kHz but not greater than 90 kHz. It is preferred that scan speed be not less than 10 mm/sec but not greater than 3000 mm/sec. When scan speed falls below 10 mm/sec, this is not preferred, because the fact that printing speed will be extremely low will cause the display body production rate to be reduced. On the other hand, when scan speed rises above 3000 mm/sec, this is not preferred, because print density will be reduced and it will be difficult to achieve a difference in color L* values that is not less than 1. It is more preferred that scan speed be not less than 100 mm/sec but not greater than 2900 mm/, and still more preferred that this be not less than 200 mm/sec but not greater than 2800 mm/.

4. Display Body Pouch Forming Method

A display body in accordance with the present invention might be favorably used as packaging on which there is printing. As packaging, vertical pillow pouches, horizontal pillow pouches, gusseted pouches, and other such pouches formed through use of heat sealing, weld pouches formed through use of weld seals, and so forth may be cited as examples. Furthermore, for adhesion thereof, hot-melt or other such adhesives may be employed. Moreover, packaging also includes lid members for plastic containers and labels for bottles which are formed in cylindrical fashion through use of center seals accomplished by means of solvents. Note that it is sufficient that at least a portion of the packaging be made up of a display body in accordance with the present invention.

A display body in accordance with the present invention, or packaging having same, may be favorably used for foods, pharmaceutical agents, industrial products, and various other such goods.

WORKING EXAMPLES

Next, although the present invention is described below in more specific terms by way of working examples and comparative examples, the present invention is not to be limited in any way by the modes employed in such working examples, it being possible for changes to be made as appropriate without departing from the gist of the present invention.

Polyolefin Raw Material

Polyolefin A

As Polyolefin A, FS2011DG3 manufactured by Sumitomo Chemical Co., Ltd., was used.

Polyolefin B

As Polyolefin B, FS7053G3 manufactured by Sumitomo Chemical Co., Ltd., was used.

Polyolefin C 60 mass % of CaCO3 was kneaded into Polyolefin A to obtain Polyolefin C.

Polyolefin D 60 mass % of TiO2 was kneaded into Polyolefin A to obtain Polyolefin D.

Polyester Raw Materials

Polyester A

As Polyester A, RE553 manufactured by Toyobo Co., Ltd., was used.

Polyester B

As Polyester B, 50 mass % of TiO2 was kneaded into Polyester A to obtain Polyester B.

Polyester C

As Polyester C, Polyester A and "Tomatec Color 42-920A (Primary Constituent $Bi_2O_3$)" laser pigment (manufactured by Tokan Material Technology Co. Ltd.) were mixed (dry blended) in a 95:5 mass % ratio, and this was fed into a screw-type extruder, where it was heated at 275° C. and melt blended. This molten resin was expelled with cylindrical shape in continuous fashion from a strand die, this being cut at a strand cutter to obtain chip-like Polyester C (masterbatch).

Polyester D

As Polyester D, RE555 (masterbatch into which 7000 ppm of SiO2 was kneaded) manufactured by Toyobo Co., Ltd., was used.

Respective polyolefin raw material and polyester raw material compositions are shown in TABLE 1.

TABLE 1

| Name of raw material | Type of resin | Laser printing pigment Type | Amount added |
|---|---|---|---|
| Polyolefin A | Polypropylene | None | — |
| Polyolefin B | Propylene-ethylene copolymer | None | — |
| Polyolefin C | Polypropylene | $CaCO_3$ | 60 mass % |
| Polyolefin D | Polypropylene | $TiO_2$ | 60 mass % |
| Polyolefin E | 70 mass % polymethylpentene/ 30 mass % polystyrene | None | — |
| Polyester A | Polyethylene terephthalate | None | — |
| Polyester B | Polyethylene terephthalate | $TiO_2$ | 50 mass % |
| Polyester C | Polyethylene terephthalate | $Bi_2O_3$ | 5 mass % |
| Polyester D | Polyethylene terephthalate | $SiO_2$ | 7000 ppm |

Film 1

Polyolefin A, Polyolefin C, and Polyolefin D were mixed in a 47:50:3 mass % ratio as raw material for Layer A; Polyolefin A, Polyolefin B, and Polyolefin C were mixed in a 20:60:20 mass % ratio as raw material for Layer B.

The raw materials mixed for Layer A and Layer B were respectively fed into different screw-type extruders, and were melted and extruded from a T die at a shear rate of 1420 $sec^{-1}$. A feedblock was used partway along the flow paths of the respective molten resins so as to cause them to be joined, and this was expelled from a T die and taken up at a draft ratio of 0.8 as it was cooled on a chill roller, the surface temperature of which was set to 30° C., to obtain unstretched laminated film. Molten resin flow paths were established so as to cause the laminated film to be such that the central layer thereof was Layer A, and the two surfacemost layers thereof were Layer B (i.e., a B/A/B constitution in which there were three layers of two species), the amounts expelled therefrom being adjusted so as to cause the thickness ratio of Layer A and Layer B to be 90/10 (B/A/B=5/90/5).

The cooled and solidified unstretched laminated film which was obtained was guided to a machine direction stretching device in which a plurality of groups of rollers were arranged in continuous fashion, and this was made to undergo preheating on preheating rollers until the film temperature reached 125° C., following which this was stretched by a factor of 4×.

Following machine direction stretching, the film was guided to a transverse direction stretching device (tenter), where it was made to undergo preheating for 8 seconds until the surface temperature thereof reached 155° C., following which it was stretched by a factor of 9.8× in the transverse direction (horizontal direction). Following transverse direction stretching. the film was guided while still in that state to an intermediate zone, being made to pass therethrough in 1 second. While in the intermediate zone of the tenter, where rectangular strips were made to hang down from above while the film was kept from passing therethrough, note that hot air from the heat treatment zone and hot air from the zone in which stretching in the transverse direction was carried out was blocked, so that those strips were made to hang down from above in almost perfectly vertical fashion.

Thereafter, following passage through the intermediate zone, the film was guided to the heat treatment zone, where heat treatment was carried out for 9 seconds at 155° C. At this time, at the same time that heat treatment was being carried out, the distance between clips in the transverse direction of the film was reduced, causing this to undergo 6% relaxation treatment in the transverse direction. Following passage through the final heat treatment zone, the film was cooled for 5 seconds in a cooling airstream at 30° C. Portions were cut and removed from the two edges thereof and this was rolled up into a roll 400 mm in width to continuously manufacture a prescribed length of biaxially stretched film of thickness 80 μm. The properties of the film that was obtained were evaluated in accordance with the foregoing methods. Manufacturing conditions and the results of evaluation are shown in TABLE 2 TABLE 2A.

Films 2-11

In similar fashion as at Film 1, the various conditions were altered to continuously form films at Films 2 through 11. Note that Film 7 was not made to undergo stretching (the stretching ratio was 1) in the machine direction, being a uniaxially stretched film that was formed by causing this to undergo stretching in the transverse direction only. Manufacturing conditions and the results of evaluation for the respective films are shown in TABLE 2A and TABLE 2B.

Working Example 1

Film 1 was cut so as to be A4 size (290 mm in the machine direction×210 mm in the transverse direction), and a 355 nm-wavelength UV laser (MD-U1000C Laser Marker manufactured by Keyence Corporation) was used with a pulse frequency of 20 kHz, scan speed of 1000 mm/minute, and output of 50% to print "12345ABCDE" in the central portion of the film to fabricate a display body. Size per character was approximately 1 mm in height×approximately 1 mm in width. Display body fabrication conditions are shown in-TABLE 3 TABLE 3A.

Working Example 2

Film 1 was cut so as to be A4 size (290 mm in the machine direction×210 mm in the transverse direction), and a 1064 nm-wavelength fiber laser (8028 Trotec Speedy 100 flexx Laser Marker manufactured by Trotec) was used with a pulse frequency of 20 kHz, scan speed of 1000 mm/minute, and output of 80% to print "12345ABCDE" in the central portion of the film to fabricate a display body. Size per character was approximately 10 mm in height× approximately 5 mm in width. Display body fabrication conditions are shown in TABLE 3A.

Working Examples 3-9; Comparative Examples 1-7

In similar fashion as at Working Examples 1 and 2, the type of film used and laser source/irradiation conditions were variously altered to fabricate the display bodies of Working Examples 3 through 8 and Comparative Examples 1 through 7. Note that an MD-U1000C Laser Marker manufactured by Keyence Corporation was employed in all cases where a UV laser was used, and a 8028 Trotec Speedy 100 flexx Laser Marker manufactured by Trotec was employed in all cases where a fiber laser was used. Display body fabrication conditions are shown in TABLE 3B.

Reference Example

As Reference Example, commercially available display body on which printing had been carried out by means of an ink ribbon was employed. More specifically, the use-by date written on the back surface of the outer wrapper (the largest wrapper, within which nine individually wrapped items were wrapped) employed in a Choco Pie Party Pack (containing nine items) manufactured by Lotte Co., Ltd., was used as the display body in a Reference Example.

TABLE 2A

|  |  | Film 1 | Film 2 | Film 3 | Film 4 | Film 5 | Film 6 |
|---|---|---|---|---|---|---|---|
| Raw material composition at Layer A [mass %] | Polyolefin A | 47 | 55 | 40 | 15 | 0 | 10 |
|  | Polyolefin B | 0 | 0 | 25 | 10 | 0 | 0 |
|  | Polyolefin C | 50 | 20 | 30 | 75 | 0 | 0 |
|  | Polyolefin D | 3 | 25 | 5 | 0 | 0 | 10 |
|  | Polyolefin E | 0 | 0 | 0 | 0 | 7 | 0 |
|  | Polyester A | 0 | 0 | 0 | 0 | 88 | 80 |
|  | Polyester B | 0 | 0 | 0 | 0 | 5 | 0 |
|  | Polyester C | 0 | 0 | 0 | 0 | 0 | 0 |
|  | Polyester D | 0 | 0 | 0 | 0 | 0 | 0 |
| Raw material composition at Layer B [mass %] | Polyolefin A | 20 | 30 | 50 | 60 | 0 | 0 |
|  | Polyolefin B | 60 | 70 | 0 | 30 | 0 | 0 |
|  | Polyolefin C | 20 | 0 | 0 | 0 | 0 | 0 |
|  | Polyolefin D | 0 | 0 | 50 | 10 | 0 | 0 |
|  | Polyolefin E | 0 | 0 | 0 | 0 | 0 | 0 |
|  | Polyester A | 0 | 0 | 0 | 0 | 60 | 80 |
|  | Polyester B | 0 | 0 | 0 | 0 | 30 | 5 |
|  | Polyester C | 0 | 0 | 0 | 0 | 0 | 0 |
|  | Polyester D | 0 | 0 | 0 | 0 | 10 | 10 |
| Laser pigment at Layer A | Type | $TiO_2/CaCO_3$ | $TiO_2/CaCO_3$ | $TiO_2/CaCO_3$ | $CaCO_3$ | $TiO_2$ | $TiO_2$ |
|  | Amount added [mass %] | 1.8/30 | 15/12 | 3/18 | 45 | 2.5 | 6 |
| Laser pigment at Layer B | Type | $CaCO_3$ | None | $TiO_2$ | $TiO_2$ | $TiO_2$ | $TiO_2$ |
|  | Amount added [mass %] | 12 | — | 30 | 6 | 15 | 5 |
| Void forming agent at Layer A | Type | $CaCO_3$ | $CaCO_3$ | $CaCO_3$ | $CaCO_3$ | TPX/PS | PP |
|  | Amount added [mass %] | 30 | 12 | 18 | 45 | 4.9/2.1 | 14 |
| Void forming agent at Layer B | Type | $CaCO_3$ | None | None | None | None | None |
|  | Amount added [mass %] | 12 | — | — | — | — | — |
| Shear rate [$sec^{-1}$] |  | 1420 | 1000 | 940 | 1100 | 120 | 105 |
| Draft ratio |  | 0.8 | 1.3 | 2.4 | 1.7 | 9.1 | 3.5 |
| Layered constitution |  | B/A/B | B/A/B | B/A/B | B/A/B | B/A/B | B/A/B |
| Ratio of thicknesses of respective layers [vol %] |  | 5/90/5 | 20/60/20 | 5/90/5 | 10/80/10 | 25/50/25 | 5/90/5 |
| Stretching in machine direction (vertical stretching) | Stretching temperature [° C.] | 125 | 115 | 120 | 120 | 90 | 88 |
|  | Stretching ratio | 4.0 | 4.5 | 4.4 | 4.3 | 3.3 | 3.2 |
| Stretching in transverse direction (horizontal stretching) | Stretching temperature [° C.] | 155 | 150 | 150 | 150 | 115 | 120 |
|  | Stretching ratio | 9.8 | 10.7 | 10.5 | 10.5 | 4.4 | 4.5 |
| Heat treatment | Temperature [° C.] | 155 | 155 | 155 | 155 | 225 | 210 |
|  | Percent relaxation (transverse direction) [%] | 6 | 8 | 6 | 6 | 5 | 3 |
| Film thickness [µm] |  | 80 | 30 | 50 | 60 | 50 | 30 |

TABLE 2B

|  |  | Film 7 | Film 8 | Film 9 | Film 10 | Film 11 |
|---|---|---|---|---|---|---|
| Raw material composition at Layer A [mass %] | Polyolefin A | 0 | 55 | 0 | 93 | 0 |
|  | Polyolefin B | 0 | 0 | 0 | 0 | 0 |
|  | Polyolefin C | 0 | 20 | 100 | 5 | 0 |
|  | Polyolefin D | 0 | 25 | 0 | 2 | 0 |
|  | Polyolefin E | 5 | 0 | 0 | 0 | 0 |
|  | Polyester A | 72 | 0 | 0 | 0 | 97 |
|  | Polyester B | 20 | 0 | 0 | 0 | 0 |
|  | Polyester C | 3 | 0 | 0 | 0 | 3 |
|  | Polyester D | 0 | 0 | 0 | 0 | 0 |
| Raw material composition at Layer B [mass %] | Polyolefin A | 0 | 30 | 0 | 30 | 0 |
|  | Polyolefin B | 0 | 70 | 20 | 70 | 0 |
|  | Polyolefin C | 0 | 0 | 80 | 0 | 0 |
|  | Polyolefin D | 0 | 0 | 0 | 0 | 0 |
|  | Polyolefin E | 0 | 0 | 0 | 0 | 0 |
|  | Polyester A | 90 | 0 | 0 | 0 | 90 |
|  | Polyester B | 0 | 0 | 0 | 0 | 0 |
|  | Polyester C | 0 | 0 | 0 | 0 | 0 |
|  | Polyester D | 10 | 0 | 0 | 0 | 10 |
| Laser pigment at Layer A | Type | $TiO_2/Bi_2O_3$ | $TiO_2/CaCO_3$ | $CaCO_3$ | $TiO_2/CaCO_3$ | $BiO_2$ |
|  | Amount added [mass %] | 10/1.5 | 15/12 | 60 | 1.2/3 | 1.5 |
| Laser pigment at Layer B | Type | None | None | None | None | None |
|  | Amount added [mass %] | — | — | — | — | — |
| Void forming agent at Layer A | Type | TPX/PS | $CaCO_3$ | $CaCO_3$ | $CaCO_3$ | None |
|  | Amount added [mass %] | 3.5/1.5 | 12 | 60 | 3 | — |
| Void forming agent at Layer B | Type | None | None | None | None | None |
|  | Amount added [mass %] | — | — | — | — | — |
| Shear rate [$sec^{-1}$] |  | 115 | 70 | 50 | 900 | 110 |
| Draft ratio |  | 20.5 | 0.3 | 0.5 | 2.1 | 9.6 |
| Layered constitution |  | B/A/B | B/A/B | B/A/B | B/A/B | B/A/B |
| Ratio of thicknesses of respective layers [vol %] |  | 5/90/5 | 5/90/5 | 5/90/5 | 5/90/5 | 5/90/5 |
| Stretching in machine direction (vertical stretching) | Stretching temperature [° C.] | — | 115 | 100 | 115 | 90 |
|  | Stretching ratio | 1.0 | 4.5 | 1.1 | 4.4 | 3.3 |
| Stretching in transverse direction (horizontal stretching) | Stretching temperature [° C.] | 80 | 150 | 110 | 150 | 115 |
|  | Stretching ratio | 4.0 | 10.7 | 1.4 | 10.5 | 4.4 |
| Heat treatment | Temperature [° C.] | 210 | 155 | 190 | 150 | 220 |
|  | Percent relaxation (transverse direction) [%] | 3 | 8 | 0 | 5 | 5 |
| Film thickness [μm] |  | 30 | 30 | 100 | 50 | 50 |

Film Evaluation Methods

Film evaluation methods were as follows. For samples of the nonprinted region, the samples used were cut out from regions that were not less than 1 mm away from any printed region. Note that when due to the small area of the film or the like it could not immediately be determined which was the machine direction and which was the transverse direction, where measurements were made based on provisionally established determinations regarding the machine direction and the transverse direction, this should pose no particular problem even where the provisionally established determinations regarding the machine direction and the transverse direction were rotated by 90° from the true directions.

Film Thickness (Printed Region and Nonprinted Region)

A piece was cut from the printed region, and a microtome was used to expose a cross-section of the printed region. More specifically, from the characters "12345ABCDE" printed as at FIG. 1, a sample was cut such that the total width of the portion corresponding to the leg of the "A" and the nonprinted (transparent) region was 1 cm, and such that the direction perpendicular thereto was 3 cm. Two-liquid-type epoxy adhesive (EP001N manufactured by Cemedine Co., Ltd.) was used to cause Ester Film (registered trademark) E5100-100 μm manufactured by Toyobo Co., Ltd., to adhere to the surface layer at either side of this sample to fabricate an embedded sample for cross-sectional observation. After using a microtome to slice off a cross-section from this embedded sample, an RH-2000 digital microscope manufactured by Hirox Co., Ltd., was used to observe the cross-section and to respectively measure the thicknesses of the printed region and the nonprinted region. For the display body of the Reference Example, note that an arbitrary portion of the characters at which the use-by date was written was measured. Measurement was carried out using software provided with RH-2000 digital microscope manufactured by Hirox Co., Ltd., to determine the length in the thickness direction at an image of a cross-section when observed in the manner shown in FIG. 2. This procedure was repeated three times, the average value thereof being taken to be the thickness of the printed region or the nonprinted region. The measured thicknesses of the printed region and the nonprinted region were used to calculate fractional decrease in thickness according to Formula 3, below.

Fractional decrease in thickness=$(T1-T2)/T2\times100$    Formula 3

T1=Thickness of printed region
T2=Thickness of nonprinted region

Printed Size

Of the characters "12345ABCDE" printed as at FIG. 1, a stainless steel straightedge ruler (TZ-RS15 manufactured by Kokuyo Co., Ltd.) was used to measure by visual inspection in increments of 0.5 mm the heights and widths of those at "345ABC", the average thereof being taken to be the printed size. For the display body of the Reference Example, note that an arbitrary portion of the characters at which the use-by date was written was measured. Where printed size was less than 0.5 mm, an RH-2000 digital microscope manufactured by Hirox Co., Ltd., was separately used to measure printed size. Software provided with RH-2000 digital microscope manufactured by Hirox Co. Ltd., was used for measurement of printed size.

Color L* Value (Printed Region and Nonprinted Region)

A spectroscopic color difference meter (ZE-6000; manufactured by Nippon Denshoku Industries Co., Ltd.) was used in reflection mode to respectively measure the color L* values at the printed region and the nonprinted region of a single film sample. The specific method used for measurement of the printed region was as follows.

From the characters "12345ABCDE" printed as at FIG. 1, a square sample which was 3 cm on a side was cut so as to contain the entirety of the "B" (it being considered acceptable at this time if character(s) other than the "B" also happened to be contained therein), and this was measured. Furthermore, the light source for measurement at the color difference meter employed a 6ϕ stage (the aperture on which light for measurement fell being approximately 1 cm in diameter) and a 6ϕ eyepiece, the aperture of the stage being arranged so as to contain the character "B" therewithin. Note that where printing was not completely contained within (i.e., protruded from) stage aperture, it was considered acceptable to change stage as necessary (e.g., 10ϕ, 30ϕ, etc.). Even where printing protruded therefrom, so long as a portion of printing was contained within stage aperture and light for measurement tell thereon, this was considered to be acceptable. For the display body of the Reference Example, note that an arbitrary portion of the characters at which the use-by date was written was measured.

Furthermore, for the nonprinted region, a square sample which was 3 cm on a side was cut from the region at which printing had not been carried out, and color L* values were measured using 64) components at the stage and eyepiece of the color difference meter. Note that it was considered acceptable to change the stage and/or eyepiece of the color difference meter to 10ϕ, 30ϕ, or the like as necessary, in which case it was considered acceptable to employ a sample size of arbitrary size so long as it was such as to cause the aperture of the stage to be covered (i.e., so long as it did not allow light for measurement to leak past it).

Total Luminous Transmittance (Nonprinted Region)

A hazemeter (300A; manufactured by Nippon Denshoku Industries Co., Ltd.) was used to measure the total luminous transmittance of the nonprinted region in accordance with JIS-K-7136. Measurements were carried out twice, and the average thereof was determined.

Void Content (Nonprinted Region)

Void content of the display body was calculated based on the cross-section of the nonprinted region observed above at "Film Thickness (Printed Region and Nonprinted Region)". Calculation avoid content was carried out using the automatic counting functionality at the software provided with an RH-2000 digital microscope manufactured by Hirox Co., Ltd., to count the number of voids present within the film in a cross-sectional image observed in the manner shown in FIG. 2. This procedure was repeated three times, the average value thereof being taken to be the void content.

Void Height (Thickness Direction; Nonprinted Region)

Figure 2:
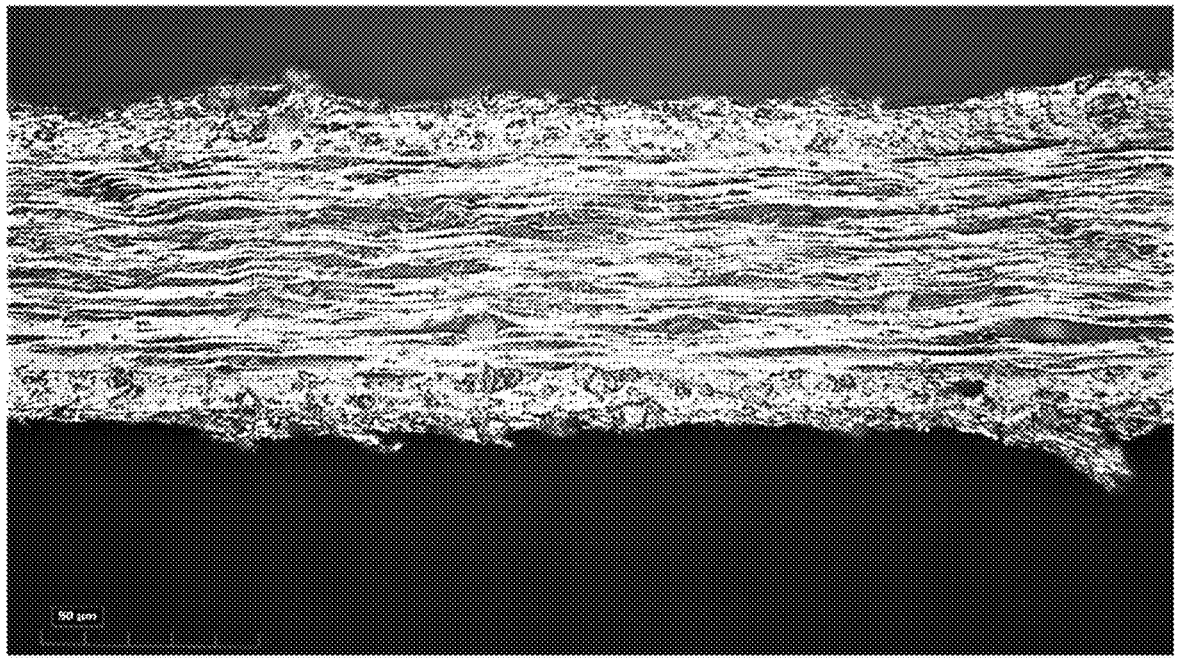
FIG. 2 Image during cross-sectional observation of nonprinted region at display body in accordance with Working Example 1.

Void height in the thickness direction of the display body was calculated based on the cross-section of the nonprinted region observed above at "Film Thickness (Printed Region and Nonprinted Region)". 10 voids were chosen at random from a cross-sectional image observed in the manner shown in FIG. 2, and the heights thereof were measured. Software provided with RH-2000 digital microscope manufactured by Hirox Co., Ltd., was used for calculation of void height. This procedure was repeated three times, the average value thereof being taken to be the void content.

Evaluation of Printed Region (Visual Inspection)

Visual perceptibility of the characters "12345ABCDE" which were printed on the display body was judged based on the following criteria.

GOOD Characters were recognizable as a result of visual inspection

BAD Characters were unrecognizable as a result of visual inspection

Furthermore, whether there was occurrence of holes at the printed region was judged based on the fractional decrease in thickness in accordance with the following criteria.

GOOD Fractional decrease in thickness was less than or equal to 80%

BAD Fractional decrease in thickness was greater than 80%

Wear Resistance of Printed Region

A simplified wear resistance testing apparatus (Model No. IMC-1557 manufactured by Imoto Machinery Co., Ltd.) was used to evaluate wear resistance at the printed region. A 150 mm×150 mm piece was cut from film containing the printed region, and this was used as a measurement sample. This was placed in the wear resistance testing apparatus so that the printed region abutted steel wool, and the printed region was made to rub against the steel wool for 10 cycles over a stroke length of 10 cm at a speed of 15 seconds per 10 cycles. Note that grade #0000 steel wool was used with no additional weight (200 g).

Following rubbing with steel wool, the printed region was evaluated by visual inspection based on the following criteria.

GOOD Characters were recognizable as a result of visual inspection (characters had not vanished due to abrasion)

BAD Characters were unrecognizable as a result of visual inspection (characters had vanished due to abrasion)

Tensile Fracture Strength

Strip-like film samples which were 140 mm in the measurement direction and 20 mm in the direction (transverse direction of the film) perpendicular to the measurement direction were prepared in accordance with JIS K7113. An "Autograph AG-Xplus" universal tensile tester (manufactured by Shimadzu Corporation) was used, the two ends of the test piece being held such that a 20 mm length thereof was gripped by a chuck at either end (chuck separation 100 mm), tensile testing being carried out under conditions of 23° C. ambient temperature and 200 mm/min elongation rate, strength (stress) at the time of tensile fracture being taken to be the tensile fracture strength (MPa). Note that the machine direction and the transverse direction were used as measurement directions.

TABLE 3A

| | | Working Example 1 | Working Example 2 | Working Example 3 | Working Example 4 | Working Example 5 | Working Example 6 | Working Example 7 | Working Example 8 | Working Example 9 |
|---|---|---|---|---|---|---|---|---|---|---|
| Film used in display body | | Film 1 | Film 1 | Film 1 | Film 2 | Film 3 | Film 4 | Film 5 | Film 6 | Film 7 |
| Laser irradiation conditions | Laser source | UV | UV | Fiber | Fiber | Fiber | Fiber | UV | Fiber | Fiber |
| | Pulse frequency [kHz] | 50 | 50 | 20 | 40 | 40 | 40 | 60 | 30 | 20 |
| | Scan speed [mm/min.] | 2500 | 2500 | 1000 | 1000 | 1200 | 800 | 2000 | 1000 | 1000 |
| | Power [%] | 30 | 30 | 80 | 30 | 30 | 30 | 20 | 50 | 60 |
| Thickness | Printed region [μm] | 54 | 69 | 51 | 12 | 22 | 16 | 53 | 18 | 6 |
| | Nonprinted region [μm] | 80 | 80 | 80 | 30 | 50 | 70 | 60 | 30 | 20 |
| | Fractional decrease [vol %] | 33 | 14 | 36 | 60 | 56 | 77 | 12 | 40 | 70 |
| Printed size | Height [mm] | 5.5 | 1 | 7.5 | 7.6 | 7.5 | 10 | 10 | 50 | 10 |
| | Width [mm] | 3.5 | 1 | 6 | 6 | 6 | 8 | 10 | 50 | 5 |
| Color L* value | Printed region | 95.1 | 95.5 | 93.6 | 92.5 | 93.2 | 91.2 | 86.3 | 90.1 | 87.4 |
| | Nonprinted region | 97.1 | 97.1 | 97.2 | 95.7 | 95.6 | 94.2 | 95.2 | 94.5 | 93.1 |
| | Difference | 2 | 1.6 | 3.6 | 3.2 | 2.4 | 3 | 8.9 | 4.4 | 5.7 |
| Total luminous transmittance [%] | Nonprinted region | 13 | 13 | 14 | 13 | 25 | 11 | 14 | 13 | 35 |
| Void content [%] | Nonprinted region | 37 | 36 | 30 | 63 | 23 | 74 | 43 | 48 | 15 |
| Void height (thickness direction) [μm] | Nonprinted region | 4.4 | 4.1 | 3.8 | 3.4 | 3.9 | 4.8 | 2.1 | 6.8 | 1.8 |
| Evaluation of printed region | Visual perceptibility | GOOD | GOOD | GOOD | GOOD | GOOD | GOOD | GOOD | GOOD | GOOD |
| | Hole formation | GOOD | GOOD | GOOD | GOOD | GOOD | GOOD | GOOD | GOOD | GOOD |
| | Wear resistance at printed region | GOOD | GOOD | GOOD | GOOD | GOOD | GOOD | GOOD | GOOD | GOOD |
| Tensile fracture strength [MPa] | Nonprinted region: machine direction | 54 | 60 | 56 | 60 | 55 | 42 | 91 | 136 | 42 |
| | Nonprinted region: transverse direction | 158 | 155 | 159 | 145 | 154 | 132 | 110 | 178 | 230 |

TABLE 3B

| | | Comparative Example 1 | Comparative Example 2 | Comparative Example 3 | Comparative Example 4 | Comparative Example 5 | Comparative Example 6 | Comparative Example 7 | Reference Example |
|---|---|---|---|---|---|---|---|---|---|
| Film used in display body | | Film 8 | Film 9 | Film 10 | Film 11 | Film 2 | Film 1 | Film 1 | Commercially available product |
| Laser irradiation conditions | Laser source | Fiber | Fiber | UV | Fiber | Fiber | UV | UV | Ink |
| | Pulse frequency [kHz] | 20 | 40 | 50 | 20 | 20 | 40 | 40 | |
| | Scan speed [mm/min.] | 1000 | 200 | 2000 | 200 | 1000 | 2000 | 2000 | |
| | Power [%] | 80 | 80 | 50 | 50 | 50 | 5 | 40 | |
| Thickness | Printed region [μm] | 0 | 100 | 48 | 30 | 0 | 78 | 75 | 46 |
| | Nonprinted region [μm] | 30 | 100 | 50 | 30 | 30 | 80 | 80 | 45 |
| | Fractional decrease [vol %] | 92 | 0 | 4 | 0 | 98 | 3 | 6 | −2 |
| Printed size | Height [mm] | 7.5 | — | — | — | 7.5 | — | 0.1 | 3.5 |
| | Width [mm] | 6 | — | — | — | 6 | — | 0.1 | 2 |
| Color L* value | Printed region | 91.5 | 95.8 | 93.7 | 86.9 | 93.1 | 97.2 | 96.9 | 86.1 |
| | Nonprinted region | 95.3 | 96.6 | 94.5 | 93.4 | 95.4 | 97.7 | 97.7 | 95.9 |
| | Difference | 3.8 | 0.8 | 0.8 | 6.5 | 2.3 | 0.5 | 0.8 | 9.8 |
| Total luminous transmittance [%] | Nonprinted region | 15 | 22 | 65 | 89 | 13 | 13 | 13 | 21 |
| Void content [%] | Nonprinted region | 86 | 0 | 8 | 0 | 65 | 33 | 38 | — |
| Void height (thickness direction) [μm] | Nonprinted region | 9.3 | 0 | 3.2 | 0 | 3.2 | 4.3 | 3.8 | — |
| Evaluation of printed region | Visual perceptibility | GOOD | BAD | BAD | BAD | GOOD | BAD | BAD | GOOD |
| | Hole formation | BAD | GOOD | GOOD | GOOD | BAD | GOOD | GOOD | — |
| | Wear resistance at printed region | GOOD | GOOD | GOOD | GOOD | GOOD | GOOD | GOOD | BAD |
| Tensile fracture strength [MPa] | Nonprinted region: machine direction | 61 | 10 | 65 | 217 | 66 | 54 | 57 | 111 |
| | Nonprinted region: transverse direction | 153 | 29 | 157 | 236 | 160 | 161 | 154 | 232 |

Film Manufacturing Conditions and Results of Evaluation

The display bodies at Working Examples 1 through 9 were all excellent in terms of the properties listed at TABLE 3A, satisfactory results of evaluation having been obtained.

On the other hand, for the reasons given below, the results at Comparative Examples 1 through 7 were all unsatisfactory.

At Comparative Example 1, because void height exceeded 8 μm and void content exceeded 80 vol %, laser irradiation caused formation of holes, making this unsatisfactory as a display body. That void properties were not within prescribed ranges was due to the fact that the shear rate and draft ratio of Film 8 which was employed here at were not within prescribed ranges.

At Comparative Example 2, despite the fact that laser power was increased, the fractional decrease in thickness was 0%, the difference in color L* values was less than 1.0, and printing was unrecognizable. This was due to the fact that Film 9 which was employed here at contained no voids, and laser pigment exceeded 50 mass %.

At Comparative Example 3, although void height was 3.2 μm and the fractional decrease in thickness was 4%, because the amount of void forming agent that was present was less than 5 wt %, the difference in color L* values at regions irradiated by laser was less than 1.0, total luminous transmittance was less than 50%, and printing was unrecognizable.

At Comparative Example 4, although the color L* value was 6.5 and there was a large change in color, because there was no occurrence of etching due to the fact that void content was 0%, and also due to the fact that total luminous transmittance was high, being 89%, the result was that recognition of printing was difficult.

At Comparative Example 5, where the same Film as at Working Example 2 was used and the power with which laser irradiation was carried out was increased, there was extreme occurrence of etching and there was formation of holes.

At Comparative Example 6, where the same Film as at Working Example 1 was used and the power with which laser irradiation was carried out was decreased, the difference in color L* values was 0.5 and printing was no longer recognizable.

At Comparative Example 7, where the same Film as at Working Example 1 was used and printed size was made as small as 0.1 mm, characters were no longer recognizable by visual inspection. The difference in color L* values at this time was 0.8.

INDUSTRIAL UTILITY

Because a display body in accordance with the present invention has high concealment, being a display body that permits distinct printing, that does not experience delamination of printing due to rubbing or other such external stimulation, and that is capable of being provided with high productivity, it is capable of being favorably used in packaging comprising label(s) and/or lid member(s).

The invention claimed is:

1. A display body comprising:
    at least one stretched white printing layer permitting printing by means of laser irradiation, wherein the stretched white printing layer comprises a nonprinted region, a printed region at which laser printing has been carried out, and a first polypropylene,
    a second layer comprising a second polypropylene, and
    a third layer comprising a third polypropylene,
    wherein the stretched white printing layer is between the second layer and the third layer;
    and
    wherein the following (1), (2) and (3) are satisfied:
    (1) an absolute value of a difference in color L* values between the printed region and the nonprinted region is not less than 1.0 but not greater than 10.0;
    (2) a total luminous transmittance of the nonprinted region is not less than 8% but not greater than 50%; and
    (3) a fractional decrease in a thickness of the printed region in a cross-sectional direction is not less than 1 vol % but not greater than 80 vol % of that of the nonprinted region.

2. The display body according to claim 1, wherein the stretched white printing layer further comprises a laser printing pigment comprising at least one element selected from the group consisting of bismuth, gadolinium, neodymium, titanium, antimony, tin, aluminum, calcium, and barium.

3. The display body according to claim 2, wherein the laser printing pigment comprises at least one of titanium oxide and calcium carbonate.

4. The display body according to claim 2, wherein the laser printing pigment is not less than 5 mass % but not greater than 50 mass % of the stretched white printing layer.

5. The display body according to claim 1, wherein a void content in the nonprinted region is not less than 10 vol % but not greater than 80 vol %.

6. The display body according to claim 1, wherein a thickness of the nonprinted region is not less than 5 μm but not greater than 200 μm.

7. The display body according to claim 1, wherein the stretched white printing layer further comprises polyester.

8. The display body according to claim 1, wherein the stretched white printing layer further comprises polyethylene.

9. The display body according to claim 1, wherein the stretched white printing layer further comprises polyethylene terephthalate.

10. The display body according to claim 1, wherein the stretched white printing layer further comprises calcium carbonate.

11. The display body according to claim 1, wherein the stretched white printing layer comprises titanium oxide.

12. The display body according to claim 1, wherein the stretched white printing layer further comprises polyester and polystyrene.

13. A packaging comprising a lid member including the display body according to claim 1.

14. A packaging comprising a label including the display body according to claim 1.

* * * * *